US009406029B2

United States Patent
Susarla et al.

(10) Patent No.: US 9,406,029 B2
(45) Date of Patent: Aug. 2, 2016

(54) MODELER FOR PREDICTING STORAGE METRICS

(71) Applicant: NetApp, Inc., Sunnyvale, CA (US)

(72) Inventors: Sai Rama Krishna Susarla, Bangalore (IN); Kaladhar Voruganti, San Jose, CA (US); Vipul Mathur, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 206 days.

(21) Appl. No.: 14/143,012

(22) Filed: Dec. 30, 2013

(65) Prior Publication Data

US 2014/0136456 A1    May 15, 2014

Related U.S. Application Data

(63) Continuation of application No. 13/016,892, filed on Jan. 28, 2011, now Pat. No. 8,620,921.

(51) Int. Cl.
    *G06F 17/30* (2006.01)
    *G06N 99/00* (2010.01)
    *G06F 11/34* (2006.01)

(52) U.S. Cl.
    CPC .......... *G06N 99/005* (2013.01); *G06F 11/3409* (2013.01); *G06F 17/30294* (2013.01); *G06F 17/30587* (2013.01)

(58) Field of Classification Search
    CPC .............. G06F 3/067; G06F 11/3409; G06F 2209/5019; G06F 11/3452
    See application file for complete search history.

(56) References Cited

U.S. PATENT DOCUMENTS

| | | | | |
|---|---|---|---|---|
| 8,069,366 | B1* | 11/2011 | Wenzel | H04L 41/069 711/147 |
| 2008/0262824 | A1* | 10/2008 | Oslake | G06F 8/20 703/22 |
| 2008/0262890 | A1* | 10/2008 | Korupolu | G06F 11/0793 705/7.22 |
| 2012/0123980 | A1* | 5/2012 | Bhandari | G06N 3/12 706/13 |

OTHER PUBLICATIONS

Sivathanu et al. ("Storage Management in Virtualized Cloud Environment"), 2010, IEEE 3rd International Conference on Cloud Computing, pp. 1-8.*

* cited by examiner

*Primary Examiner* — Rehana Perveen
*Assistant Examiner* — Alexander Khong

(57) ABSTRACT

Described herein is a system and method for dynamically managing service-level objectives (SLOs) for workloads of a cluster storage system. Proposed states/solutions of the cluster may be produced and evaluated to select one that achieves the SLOs for each workload. A planner engine may produce a state tree comprising nodes, each node representing a proposed state/solution. New nodes may be added to the state tree based on new solution types that are permitted, or nodes may be removed based on a received time constraint for executing a proposed solution or a client certification of a solution. The planner engine may call an evaluation engine to evaluate proposed states, the evaluation engine using an evaluation function that considers SLO, cost, and optimization goal characteristics to produce a single evaluation value for each proposed state. The planner engine may call a modeler engine that is trained using machine learning techniques.

17 Claims, 22 Drawing Sheets

| FW Input | BW Input | | | Components | State | FW Output |
| --- | --- | --- | --- | --- | --- | --- |
| | BW1 | BW2 | BW3 | | | |
| V1, V2, V3 | V1, V2, V3 | V1, V2, V3 | V1, V2, V3 | ... | V1, V2 | V1, V2 | V1 |
| V1, V2, V3 | V1, V2, V3 | V1, V2, V3 | V1, V2, V3 | ... | V1, V2 | V1, V2 | V1 |
| V1, V2, V3 | V1, V2, V3 | V1, V2, V3 | V1, V2, V3 | ... | V1, V2 | V1, V2 | V1 |

FIG. 11

| FW Input | BW Input | Components | State | FW Output |
|---|---|---|---|---|
| V1, V2, V3 | R1, R2, R3 | V1, V2 | V1, V2 | V1 |
| V1, V2, V3 | R1, R2, R3 | V1, V2 | V1, V2 | V1 |
| V1, V2, V3 | R1, R2, R3 | V1, V2 | V1, V2 | V1 |

FIG. 12B

| FW Input | BW Input | | Components | State | FW Output |
| --- | --- | --- | --- | --- | --- |
| | S1 | S2 | | | |
| V1, V2, V3 | R1, R2, R3 | R1, R2, R3 | V1, V2 | V1, V2 | V1 |
| V1, V2, V3 | R1, R2, R3 | R1, R2, R3 | V1, V2 | V1, V2 | V1 |
| V1, V2, V3 | R1, R2, R3 | R1, R2, R3 | V1, V2 | V1, V2 | V1 |

FIG. 13B

MODELER FOR PREDICTING STORAGE METRICS

CROSS REFERENCE TO RELATED APPLICATION

The present application is a continuation of U.S. patent application Ser. No. 13/016,892, filed Jan. 28, 2011, entitled "MODELER FOR PREDICTING STORAGE METRICS," which has issued under U.S. Pat. No. 8,620,921, which is incorporated herein by reference in its entirety.

FIELD OF THE INVENTION

Embodiments of the present invention relate to storage systems, and in particular, to a modeler for predicting storage metrics.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access data containers stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many server. In some embodiments, the storage system architecture provides one or more aggregates, each aggregate comprising a set of one or more storage devices (e.g., disks). Each aggregate may store one or more storage objects, such as and one or more volumes. The aggregates may be distributed across a plurality of storage systems interconnected as a cluster. The storage objects (e.g., volumes) may be configured to store content of data containers, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each server typically executes numerous applications requiring the data services of the cluster. As such, each application may be considered a workload that is serviced by the cluster. Each workload may have zero or more specified service-level objectives (SLOs). Each SLO of a workload comprises a target value of a target SLO metric, the target value to be achieved by the cluster when servicing the workload. A target SLO metric may relate to a storage system characteristic or attribute, such as a performance or protection metric. For example, a workload may have an SLO specifying a minimum value of X (the target value) for data throughput (the SLO metric) to be achieved by the cluster when servicing the workload.

Typically, the cluster will simultaneously service numerous workloads of different types and with varying levels of service, as specified by the SLOs. In this situation, performance and protection problems may arise where since different types of workloads may typically cause substantial interference with each other. This consolidation of storage services provided by the cluster for multiple types of workloads provides significant economies of scale. However, the cluster should provide such service without violating any SLOs of any of the workloads (i.e., should achieve all SLOs of all workloads being serviced). The increasing size and complexity of modern storage clusters has made storage capacity planning and storage administration, for ensuring that all SLOs of all workloads are achieved, very difficult.

To ensure all SLOs are achieved, a monitoring procedure referred to as "MAPE" has been developed to monitor the SLOs and help determine solutions if any SLOs are violated (i.e., not achieved). As known in the art, the MAPE procedure will constantly monitor (M) each SLO and workload to determine any SLO violations, and if so, will analyze (A) and plan (P) multiple proposed solutions to help in selecting a particular solution, and then execute (E) the selected solution.

A planner engine is typically used to produce and evaluate the multiple proposed solutions to help select a particular solution to execute. Current planner engines, however, cannot receive or consider new information for producing and evaluating the multiple proposed solutions without substantial reconfiguration of the planner engine. As such, current planner engines cannot dynamically receive or consider new information when producing and evaluating the proposed solutions.

The planner engine may use an evaluation engine for evaluating each proposed solution by using various evaluation functions. The evaluation functions produce values predicted to be produced by the proposed solution for various storage system metrics. These evaluation values may be used to evaluate the proposed solution, for example, by a system administrator. Typically the evaluation engine produces evaluation values for each proposed solution that may be difficult to analyze for determining the desirability of each proposed solution. Also, typically the evaluation engine is configured to use particular evaluation functions to produce values for particular metrics and the planner engine is configured to receive values for the particular metrics and process them accordingly. As such, the evaluation functions used by the evaluation engine are typically static and difficult to modify as the evaluation engine and the planner engine would both need to be heavily modified to change the evaluation functions.

In turn, the evaluation engine may use a modeling engine for producing predicted values of system metrics that are specified in the evaluation functions. The modeling engine may predict these values based on modeling the proposed solution as hypothetically implemented in the cluster storage system. Due to the increasing complexity and number of factors involved in a cluster storage system, however, current modeling engines produce significant error in predicting these system metric values.

Intelligently considering proposed solutions and accurately predicting the results of a proposed solution prior to actual implementation (execution) of the proposed solution is of high importance due to the substantial amount of time and resources needed to reverse a proposed solution that does not achieve the intended results. As such, an effective method for considering proposed solutions and accurately predicting results of each proposed solution is needed.

SUMMARY

The embodiments described herein provide a system and method for training a modeler for predicting metrics of a storage system. The storage system may provide service to a plurality of workloads comprising a foreground workload and a first set of at least two background workloads. A modeler-training engine may be configured for receiving training data comprising a plurality of data sets. Each data set may comprise values for a plurality of input metrics of the foreground workload, values for the plurality of input metrics of the first set of background workloads, and a value for an output metric of the foreground workload.

For each data set, the modeler-training engine may summarize the values received for each input metric of the first set of background workloads to produce a representative value for each input metric of the first set of background workloads. The modeler-training engine produces a plurality of tuple sets, each tuple set representing a data set. Each tuple set comprises values for the plurality of input metrics of the foreground workload, the representative values for the plurality of input metrics of the first set of background workloads, and a value for the output metric of the foreground workload.

The modeler-training engine may then apply machine learning techniques to the plurality of tuple to produce a mapping function. The mapping function may map the plurality of input metrics of the foreground workload and the first set of background workloads to the output metric of the foreground workload. The mapping function indicates a mathematical relationship between the input metrics of the foreground workload and the first set of background workloads and the output metric of the foreground workload and may be represented by a mathematical equation.

The storage system comprises a plurality of hardware components for providing service to the plurality of workloads. In some embodiments, each background workload, in the first set of background workloads, shares use of at least one common hardware component of the storage system. In other embodiments, each background workload, in the first set of background workloads, shares use of at least one common hardware component of the storage system with the foreground workload. In some embodiments, the at least one common hardware component comprises a storage device, memory device, or processor of the storage system.

In further embodiments, the plurality of workloads serviced by the storage system further comprises a second set of background workloads. In some embodiments, each background workload, in the second set of background workloads, does not share use of at least one common hardware component with any other background workload serviced by the storage system and values for a plurality of input metrics of the second set of background workloads are discarded and not used for producing the mapping function.

The mapping function may be used later by a modeler engine for predicting a value of the output metric of the foreground workload. In these embodiments, the modeler engine is configured for collecting values for the plurality of input metrics of the foreground workload and a second set of background workloads, the second set of background workloads comprising a fewer or greater number of background workloads than the first set of background workloads, and summarizing the values received for each input metric of the second set of background workloads to produce a representative value for each input metric of the second set of background workloads. The modeler engine may then apply the mapping function to the values for the plurality of input metrics of the foreground workload and the representative values for the plurality of input metrics of the second set of background workloads to produce a predicted value for the output metric of the foreground workload.

BRIEF DESCRIPTION OF THE DRAWINGS

FIG. 11 shows a conceptual diagram of training data that has been formatted according to a plurality of input categories;

FIG. 12B shows a conceptual diagram of training data that has been processed to comprise a plurality of tuple sets;

FIG. 13B shows a conceptual diagram of training data that has been processed to comprise a plurality of tuple sets.

DETAILED DESCRIPTION

Figure 1:
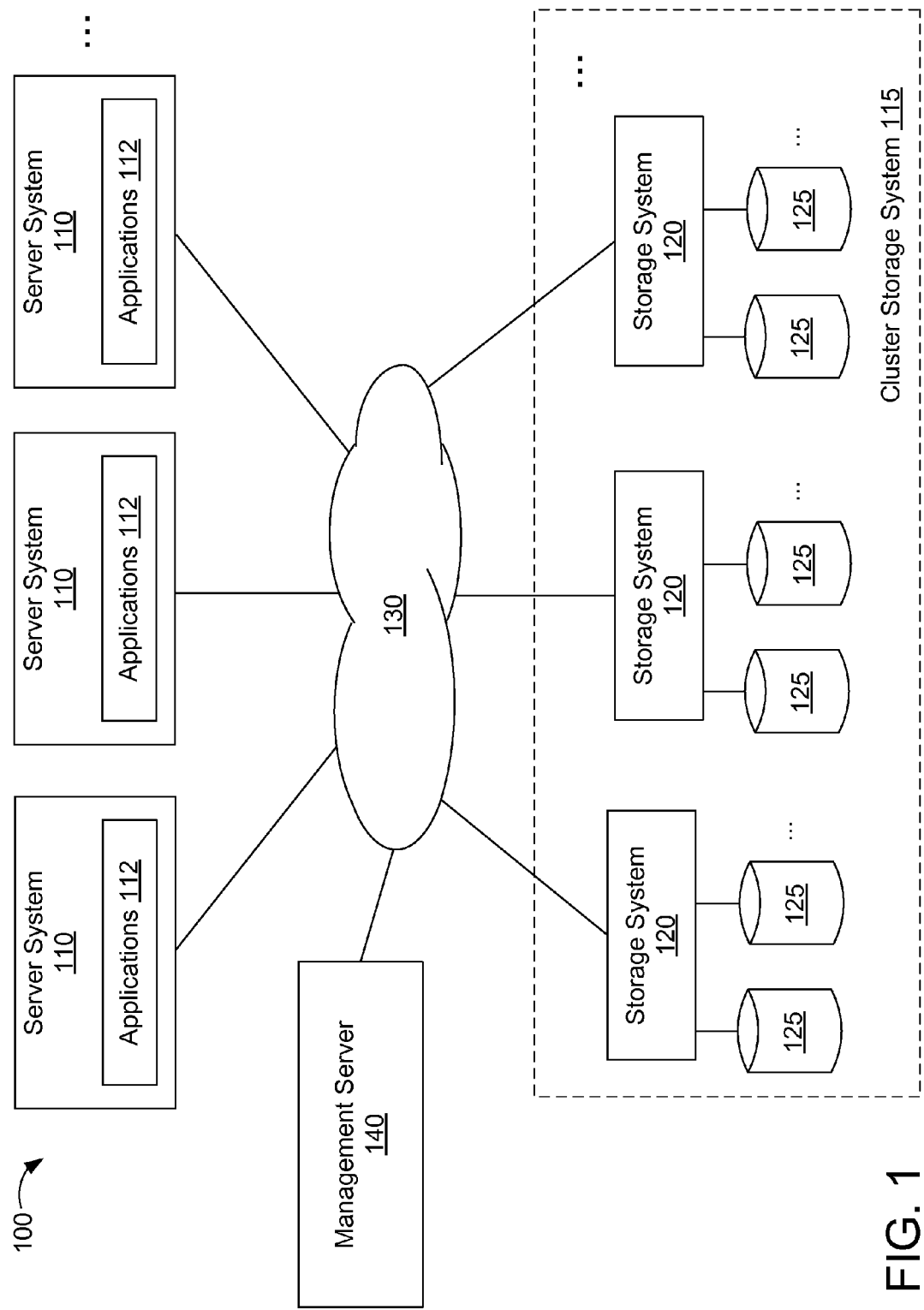
FIG. 1 is a schematic block diagram of an exemplary cluster storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into six sections. Section I contains terms used herein. Section II describes a cluster storage system environment in which some embodiments operate. Section III describes a management server for managing SLOs of the cluster storage system. Section IV describes a planner engine for producing and ranking proposed states/solutions. Section V describes an evaluation engine for producing evaluation values for each proposed state/solution. Section VI describes a modeler-training engine for training and producing a modeler engine for predicting values of storage system metrics.

I. TERMS

Aggregate: As used herein, a cluster storage system may provide one or more aggregates, each aggregate comprising a set of one or more storage devices (e.g., disks). Each aggregate may store one or more storage objects, such as one or more volumes.

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Configuration settings: Each state of the cluster has an associated set of cluster configuration settings that describe the state in terms of the configuration settings for the cluster that exist or will exist in that state. The current state has an associated set of configuration settings that are the current configuration settings of the cluster and each proposed state also has an associated set of configuration settings that will be the configuration settings of the cluster if the proposed state is implemented. The configuration settings may comprise settings for storage resources of the cluster, such as how various storage devices and storage objects are related to each other (the hierarchical layout) to form the cluster. For example, the configuration settings of the cluster may specify the aggregate and storage system location of each volume serviced by the cluster.

Costs: As used herein, costs may comprise resource utilizations needed to implement a proposed solution. Costs are a quantification of how much of the available hardware and/or software resources of a cluster will be consumed by a proposed solution. A single cost may comprise a value of a specific cost metric (a specific type of resource utilization) predicted to be produced by the proposed solution. Some examples of cost include use of a storage system's storage devices, CPU, memory, network bandwidth, power, etc. In other embodiments, other costs are considered. Predictions of the values of cost metrics may be produced by a modeler. Costs may be divided into start costs and recurring costs, a start cost comprising a one-time cost incurred when first executing/implementing the proposed solution and a recurring cost comprising an ongoing cost incurred when maintaining the proposed solution.

Metric: As used herein, a metric may comprise a measureable characteristic or attribute of hardware and/or software components of a cluster storage system or information regarding a state of the cluster storage system. A non-exhaustive list of metric examples include attributes relating to power consumption, data capacity, data throughput, storage device utilization, processor utilization, number of I/O (read/write) operations issued per second, ratio of various operations ("op mix"), per I/O data block size, number and types of storage devices, number and types of storage device controllers, number and types of CPU, number and types of memory, etc. In other embodiments, other metrics are used. A metric may relate to a specific workload of the cluster (e.g., data throughput for a particular workload). A metric may comprise an SLO metric or a cost metric. An SLO may specify a target value of a particular SLO metric (referred to as an "SLO metric"). A cost may comprise a value of a particular metric (referred to as a "cost metric") that is predicted to be produced by a proposed solution.

Optimization goals and weights: As used herein, an optimization goal may specify a desired objective (relating to costs) that is preferred for a selected solution. For example, an optimization goal may specify that solutions with lower power consumption cost (lower power resource utilization) are desired over solutions with higher power consumption cost. As such, an optimization goal may specifies a certain cost characteristic of a proposed solution that is desired and should be met by the proposed solution. An optimization goal may also specify a weight that indicates the relative level of importance of the optimization goal. As such, each optimization goal may specify an objective relating to a specific cost metric and a weight representing the importance of the objective. In some embodiments, optimization goals are used by the evaluation engine to evaluate proposed states/solutions. Examples of optimization goals include lower power consumption cost, lower economic cost, lower physical space cost, lower processor use cost, etc. In other embodiments, other optimization goals are used.

Service-level objective (SLO): As used herein, each workload may have zero or more specified service-level objectives (SLOs). Each SLO of a workload comprises a minimum or maximum target value/threshold of a SLO metric, the minimum or maximum target value to be achieved by the cluster when servicing the workload. A SLO metric may relate to a storage system characteristic or attribute. In some embodiments, a SLO metric comprises a performance or protection metric. A non-exhaustive list of examples of performance SLO metrics include data throughput, data latency, processor utilization, storage device utilization, input/output operations per second (IOPS) for storage devices, etc. A non-exhaustive list of examples of protection SLO metrics include recovery point objective (allowed time to restore data after data loss disaster situation and generally defines "acceptable loss" in a disaster situation), recovery time objective (allowed time to restore a business process after disruption or data loss disaster situation), recovery consistency objective (data consistency objectives defining a measurement for the consistency of distributed business data within interlinked systems after a disaster incident), etc.

Solutions and actions: As used herein, a solution comprises a set of one or more specific actions to be executed on the cluster. A type of action is a general action, such as throttling, migrating a storage object, resize (increase or decrease storage size) a storage object, extra resource provisioning (adding storage resources), compressing or deduplicating a storage object, perform backup snapshot of a storage object, etc. In other embodiments, a solution may include any other type of action. A specific action is a type of action applied to a specific item, such as migrate storage object) from aggregate1 to aggregate2, compress storage object2, adding two storage devices to aggregate3, etc. As such, a solution may comprise a set of one or more specific actions of one or more action types (e.g., migrate storage object) from aggregate1 to aggregate2 and compress storage object2). A selected proposed solution is the solution selected to be executed.

States and Nodes: A state is a state of the cluster storage system. Each proposed state has an associated solution and an associated set of configuration settings. The proposed state comprises the state of the cluster if the associated solution is executed, thus changing a current state of the cluster to the proposed state. As such, each proposed state comprises the hypothetical/predicted state of the cluster if the associated solution is executed. The associated set of configuration settings comprises the configuration settings of the cluster if the associated solution is executed and the proposed state is achieved. A proposed node in the state tree represents a proposed state of the cluster that is produced by implementing the proposed solution associated with the proposed state. As such, a proposed node may represent a proposed state as well as the solution and configuration settings associated with the proposed state.

Storage object: As used herein, a storage object comprises any logically definable storage element stored or contained within a cluster storage system. Each storage object may be stored in a particular aggregate of a particular storage system of the cluster storage system. A non-exhaustive list of storage object examples include volumes or virtual volumes (e.g., flexible volumes) in a storage system, logical units (LUs) in a q tree, q trees in a volume, disk images in a volume, etc. In other embodiments, storage objects comprise any other logically definable storage element stored or contained within the cluster storage system.

Throttling: As used herein, throttling is a mechanism that observes a system periodically and controls (throttles) the rate of request admission from workloads in the cluster whenever required to mitigate SLO violations of the workloads. The throttling mechanism typically has low overhead costs in terms of time and resources but does not typically resolve SLO violations for the longer term.

Workload: As used herein, a "workload" of a cluster storage system may comprise an application, data set(s) of the application, and/or underlying storage object(s) provisioned to the application. As used herein, the terms "application," "data set," and "storage object" may sometimes be used interchangeably to denote a "workload" requiring data services and resources of the cluster storage system. A foreground workload comprises a workload that triggers the management server or planner engine processes described herein. For example, the foreground workload may comprise a workload experiencing an SLO violation or a workload being added (deployed), removed, or modified. All other workloads of the cluster may be referred to as background workloads.

II. CLUSTER STORAGE SYSTEM ENVIRONMENT

FIG. 1 is a schematic block diagram of an exemplary cluster storage system environment 100 in which some embodiments operate. The environment 100 comprises a set of one or more server systems 110, a cluster 115 comprising a set of one or more storage systems 120, and a management server 140 that are connected via a connection system 130. In other embodiments, the cluster 115 comprises a plurality of storage systems 120. Each storage system 120 comprises a set of one or more storage devices 125. The connection system 130 may comprise a network, such as a Local Area Network (LAN), Wide Area Network (WAN), metropolitan area network (MAN), the Internet, or any other type of network or communication system between computer systems.

Each storage system 120 may have a distributed architecture. For example, each storage system 120 may include separate N module (network module) and D module (data module) components (not shown). In such an embodiment, the N module is used to communicate with the server systems 110, while the D module includes the file system functionality and is used to communicate with the storage devices 125. In another embodiment, the storage server 108 may have an integrated architecture, where the network and data components are all contained in a single box or unit. The storage system 120 may be coupled through a switching fabric (not shown) to other storage systems 120 in the cluster 115. In this way, all the storage systems 120 of the cluster 115 may be interconnect to form a single storage pool that may be accessed by the connected server systems 110.

The storage systems 120 comprise functional components that cooperate to provide a distributed storage system architecture providing consolidated data services to the server systems 110. A server system 110 may comprise a computer system that utilizes services of the cluster storage system 115 to store and manage data in the storage devices 125 of the storage systems 120. Interaction between a server system 110 and a storage system 120 can enable the provision of storage services. That is, server system 110 may request the services of the storage system 120, and the storage system 120 may return the results of the services requested by the server system 110, by exchanging packets over the connection system 130. The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores data in a set of storage devices 125, preferably on one or more writable storage device media (such as magnetic disks, video tape, optical, DVD, magnetic tape, and any other similar media adapted to store information, including data and parity information). The storage system 120 may implement a file system to logically organize the data as storage objects on the storage devices 125. A storage system 120 or a server system 110 may execute one or more applications that submit access requests for accessing particular storage objects on the storage devices 125.

Figure 2:
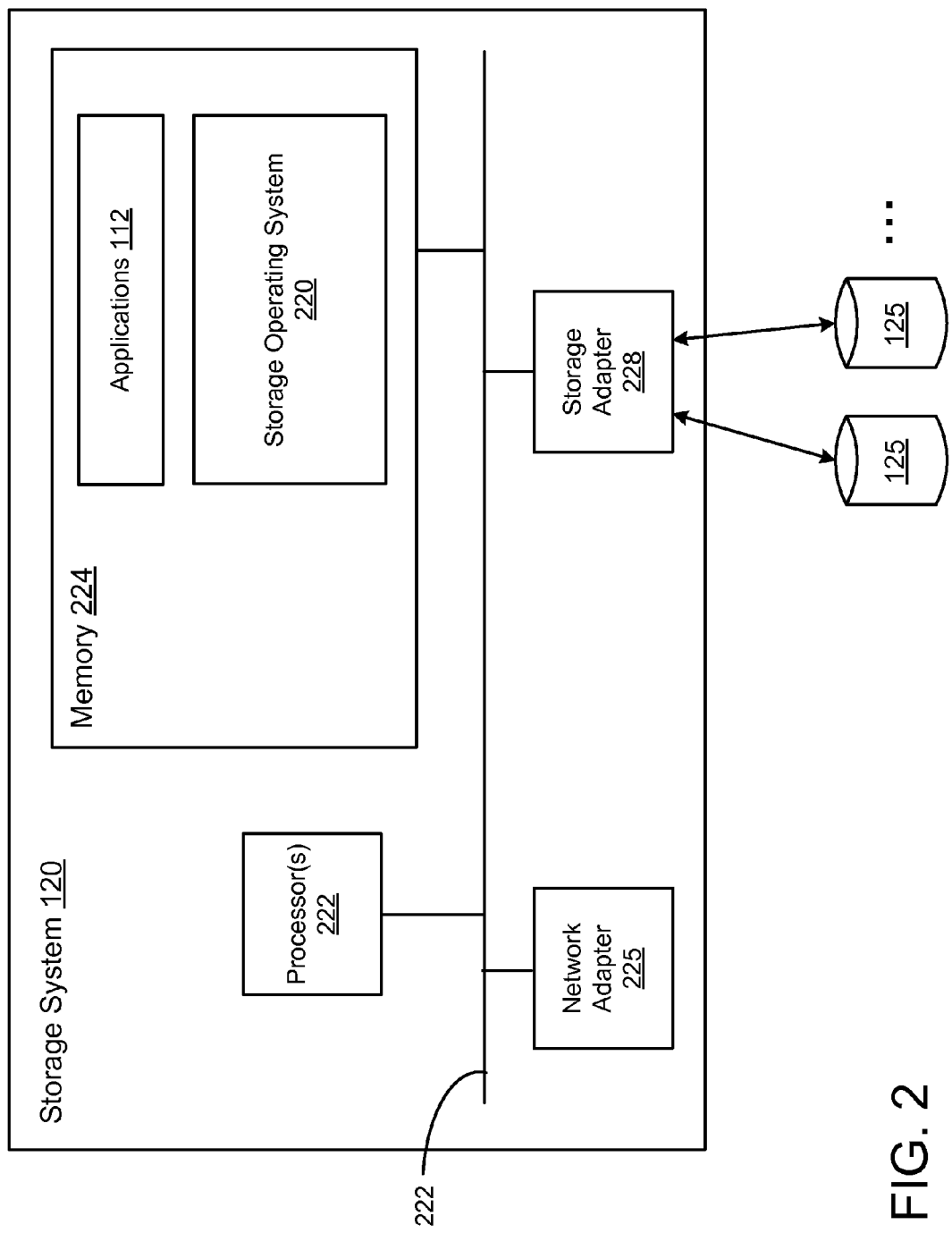
FIG. 2 is a diagram illustrating various components of the storage system, in accordance with some embodiments.

FIG. 2 is a diagram illustrating various components of the storage system 120, in accordance with some embodiments. Specifically, the storage system comprises one or more processors 222, a memory 224, a network adapter 225, and a storage adapter 228 interconnected by a system bus 223. The storage system 120 executes a storage operating system 230 that implements a storage file system. The memory 224 comprises storage locations that are addressable by the processors 222 and adapters 225 and 228 for storing software program code (such as the storage operating system 230) and data. The processor and adapters may, in turn, comprise processing elements and/or logic circuitry configured to execute the software code and manipulate various data.

The network adapter 225 comprises a plurality of ports adapted to couple the storage system 120 to one or more server systems 110 over point-to-point links, wide area networks, virtual private networks implemented over a public network (Internet) or a shared local area network. A server system 110 may establish a connection with a storage system 120 through the network adapter 225 to access the storage devices 125 of the storage system (through use of the storage adapter 228). In some embodiments, an application 112 executing on the server system 110 may establish a connection with a storage system 120 to access the storage devices 125.

The storage adapter 228 is coupled with the storage devices 125 of the storage system and cooperates with the storage operating system 230 to access particular data on the storage devices 125 (e.g., as requested by an application 112 executing on the server system 110). The storage adapter 228 comprises a plurality of ports having input/output (I/O) interface circuitry that couples to the storage devices 125 over an I/O interconnect arrangement. The storage operating system 230, portions of which are typically resident in memory 224 and executed by the processing elements, functionally organizes the storage system 120 by, inter alia, invoking storage operations in support of the storage service implemented by the storage system 120. It will be apparent to those skilled in the art that other processing and memory means, including various computer readable media, may be used for storing and executing program instructions pertaining to the invention described herein.

The storage system 120 executes a storage operating system 230 that implements a storage file system. In this sense, the Data ONTAP® storage operating system, available from Network Appliance, Inc. of Sunnyvale, Calif., that implements a Write Anywhere File Layout (WAFL®) file system, is an example of such a storage operating system implemented as a microkernel within an overall protocol stack and associated storage. The storage operating system 230 can also be implemented as an application program operating over a general-purpose operating system, such as UNIX® or Windows®, or as a general-purpose operating system with configurable functionality, which is configured for storage applications as described herein.

The storage operating system 230 may implement the storage file system to logically organize data on the storage devices 125 as one or more storage objects and provide a logical/virtual representation of how the storage objects are organized on the storage devices 125. As such, a cluster of one or more storage systems 120 may also organize and store one or more storage objects. As used herein, a storage object comprises any logically definable storage element stored or contained within the cluster storage system 115. Each storage object may be stored in a particular aggregate (comprising a plurality of storage devices 125) of a particular storage system 120 of the cluster storage system 115. The storage operating system 230 of a storage system 120 also manages access to the storage objects stored on the storage devices 125. In some embodiments, an application 112 may establish a connection with the storage operating system 230 to access storage devices 125 of the storage system 120. The application 112 may implement various connections having various protocols to establish a connection with the storage system 120, such as an iSCSI or a Transport Control Protocol (TCP) connection.

III. MANAGEMENT SERVER FOR MANAGING SLOS OF THE CLUSTER

Each storage system 120 may execute one or more applications 112 (shown in FIG. 2) and each server system 110 may execute one or more applications 112 (shown in FIG. 3), each application 112 using data services of the cluster 115. For example, each application 112 may submit access requests for accessing particular storage objects on the storage systems 120 of the cluster 115 and the cluster 115 may perform the received requests on the storage objects. As such, each application may be considered a "workload" of the cluster 115.

Typically, when a new application 112 is to be deployed that requires use of data services of the cluster 115, one or more data sets and one or more storage objects may be provisioned to the new application 112. A data set (e.g., a group of VM disk images, an email database, a web service file set) may comprise data needed for use by the new application. The one or more storage objects may be provisioned for containing the data set(s) of the new application. In some embodiments, a planner engine (discussed below) may be used to determine where to physically store the storage objects for the new application on the cluster 115 (e.g., determine which particular aggregate of which particular storage system 120 to store the storage objects).

Since each uses data services and resources of the cluster storage system, an application, the data set(s) of the application, and the underlying storage object(s) of the application may each be considered a "workload" of the cluster storage system and these terms may be used interchangeably. Each workload may have zero or more specified service-level objectives (SLOs). As such, an SLO may be considered as specified for an application, data set(s) of the application, and/or storage object(s) of the application. For example, the SLOs may be specified by an administrator, or may comprise default values.

The SLOs for a workload may comprise, for example, performance or protection objectives (standards) for servicing the workload. Each SLO of a workload comprises a target value of a SLO metric, the target value to be achieved by the cluster when servicing the workload. A SLO metric may relate to a storage system characteristic or attribute, such as a performance or protection metric. The target value may comprise a maximum or minimum value to be achieved by the cluster depending on the type of the SLO metric. For some SLO metrics (referred to as "higher is better" metrics), a higher value is desired and indicates better performance or protection. For these types of SLO metrics, the target value may comprise a minimum value to be achieved by the cluster.

For example, a workload may have an SLO specifying a minimum value of X (the target value) for data throughput (the SLO metric), whereby a higher data throughput value is desired. For other SLO metrics (referred to as "lower is better" metrics), a lower value is desired and indicates better performance or protection. For these types of SLO metrics, the target value may comprise a maximum value to be achieved by the cluster. For example, a workload may have an SLO specifying a maximum value of X (the target value) for data latency (the SLO metric), whereby a lower data latency value is desired.

The cluster 115 should provide data service to all the workloads without violating any SLOs of any of the workloads. A SLO is considered "violated" when the minimum or maximum target value specified by the SLO is not achieved/produced for the SLO metric by the cluster 115 when providing data service to the workload. To ensure all SLOs are achieved, a procedure referred to as "MAPE" has been developed. In some embodiments, a management server 140 is used to execute the MAPE procedure to monitor and enforce SLOs of the workloads of the cluster 115. As shown in FIG. 1, the management server 140 may be coupled to one or more server systems 110 and the cluster 115 via a connection system 130. As known in the art, the MAPE procedure will constantly monitor (M) each SLO and workload on the cluster to determine any SLO violations, and if so, will analyze (A) and plan (P) multiple proposed/potential solutions to help in selecting a particular solution, and then execute (E) the selected solution.

Figure 3:
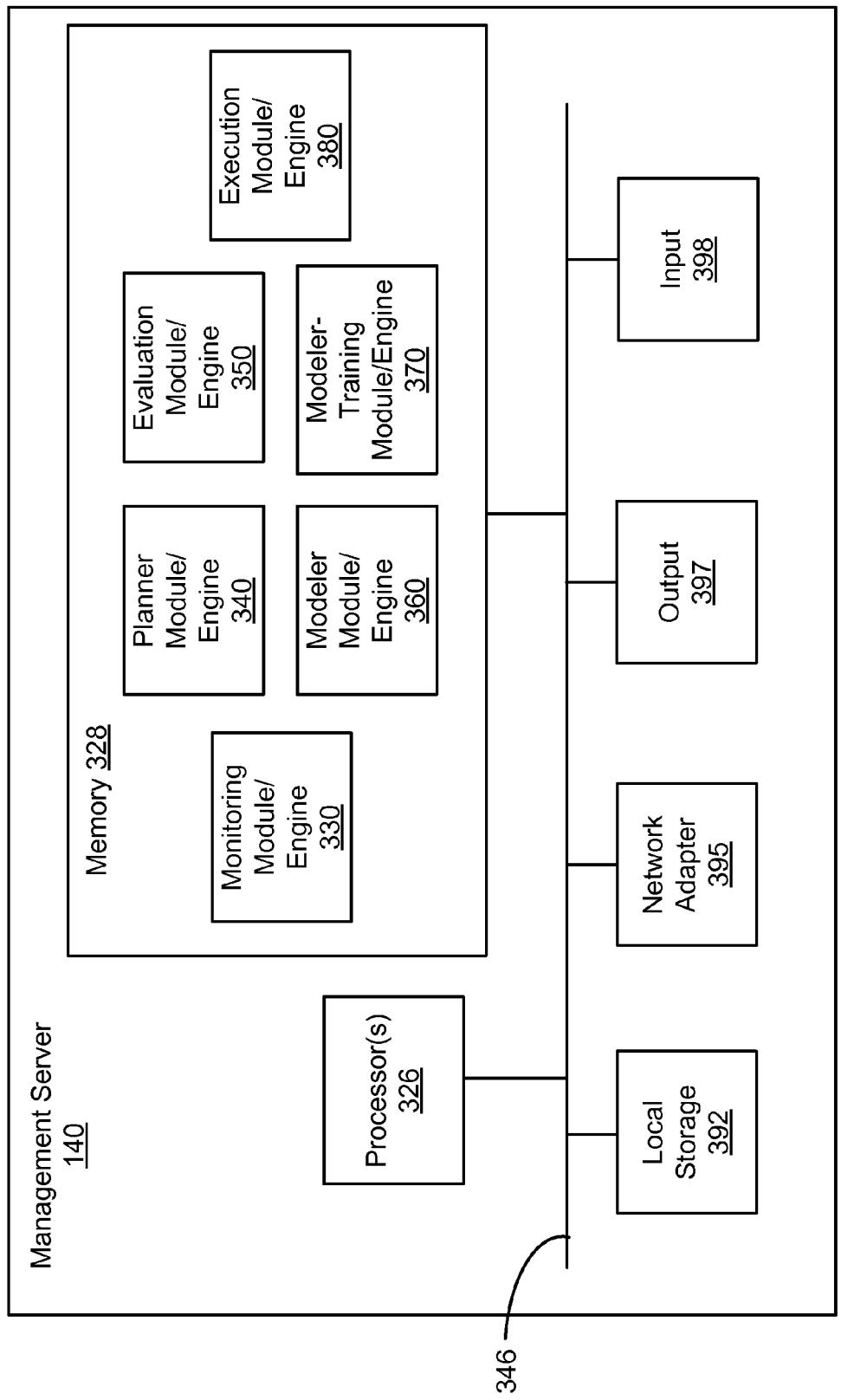
FIG. 3 is a schematic block diagram of an exemplary management server that may be employed in the storage system environment of FIG. 1.

FIG. 3 is a schematic block diagram of an exemplary management server 140 that may be employed in the cluster storage system environment of FIG. 1. The management server 140 comprises server processor(s) 326, server memory 328, a server local storage 392, a server network adapter 395, an output component 397, and an input component 398 coupled by a bus 246.

The server processors 326 are the central processing units (CPUs) of the management server 140 and, thus, control the overall operation of the management server 140. Server processors 326 may include one or more programmable general-purpose or special-purpose microprocessors, digital signal processors (DSPs), programmable controllers, application specific integrated circuits (ASICs), programmable logic devices (PLDs), or the like, or a combination of such devices. The server network adapter 395 comprises a plurality of ports adapted to couple the management server 140 to one or more other computer systems (such as servers 110 or storage systems 120) over point-to-point links, wide area networks, virtual private networks implemented over a public network (Internet) or a shared local area network. The server network adapter 395 thus may comprise the mechanical, electrical and signaling circuitry needed to connect the storage system to the network.

The output component 397 may be of any type generally used by a computer system to provide information to an end user (e.g., administrator). For example, the output component 397 could include a monitor, an audio speaker, or an alphanumeric display. Similarly, the input component 398 may be of any type that allows an end user to provide input into a computer system. For example, the input component 398 may be a keyboard, a mouse, or a speech recognition system. The input component 398 may be used, for example, by an administrator inputting SLOs, optimization goals, weights, etc.

Server memory 328 can be a random access memory (RAM), a read-only memory (ROM), or the like, or a combination of such devices. It will be apparent to those skilled in the art that other processing and memory means, including various computer readable media, may be used for storing and executing program instructions pertaining to the embodiments described herein. Server memory 328 comprises storage locations that are addressable by the processor 326 and adapters for storing software program code, such as software described herein. The server processor 326 and server adapters may, in turn, comprise processing elements and/or logic circuitry configured to execute the software code. Such software code may include a monitoring module 330, planner module 340, evaluation module 350, modeler module 360, modeler-training module 370, and an execution module 380. In some embodiments, the various modules may configure hardware components of the management server to produce a monitoring engine 330, planner engine 340, evaluation engine 350, modeler engine 360, modeler-training engine 370, and an execution engine 380.

Server local storage 392 is a storage device that stores data needed by the various modules/engines 330-380 for performing the embodiments described herein. Such data may include all SLOs specified for all workloads of the cluster, cluster configuration settings, planner template data, evaluation template data, etc. The management server 140 loads data stored on the server local storage 392 into server memory 328 from which they are accessed by server processors 326. The server local storage 392 may also store data produced by the various modules/engines 330-380 upon performing the embodiments described herein. For example, such data may include a ranked list of proposed states/solutions, etc.

In some embodiments, the various modules/engines 330-380 for performing the embodiments described herein reside and execute on the management server 140 which is external and separate from the server 110 and storage systems 120. In other embodiments, the various modules/engines 330-380 may be distributed and reside and execute on one or more servers 110 and/or one or more storage systems 120.

Figure 4:
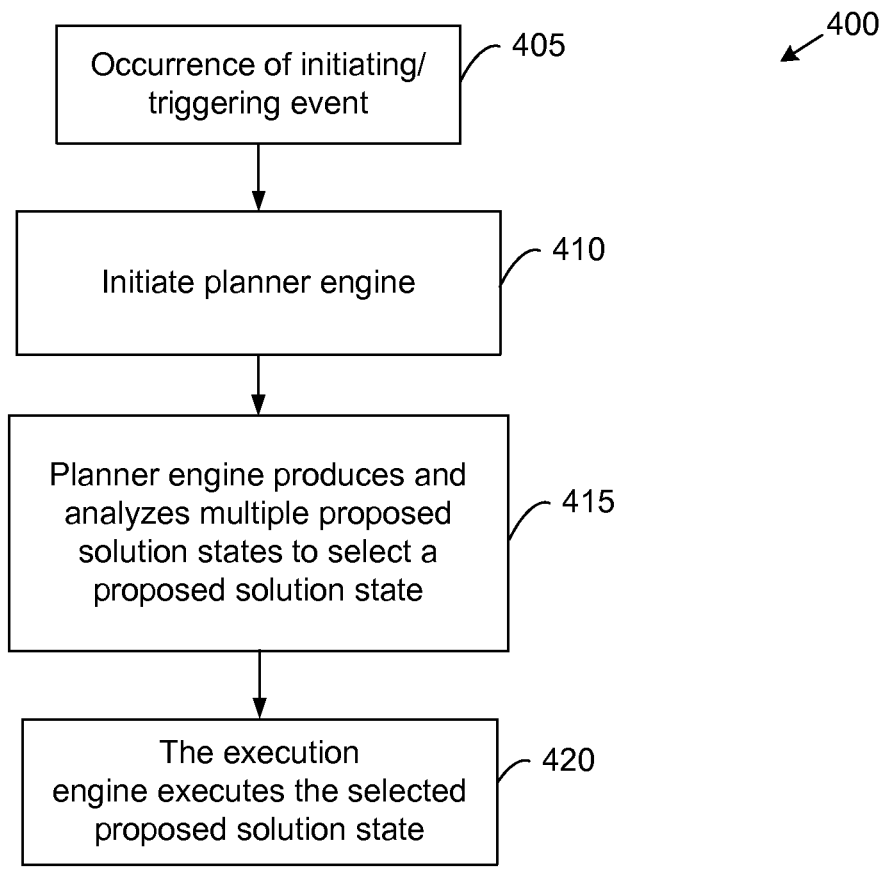
FIG. 4 is a flowchart of an SLO enforcement method for enforcing SLOs of workloads on a cluster storage system.

FIG. 4 is a flowchart of an SLO enforcement method 400 for enforcing SLOs of workloads on a cluster storage system 115. In some embodiments, the method 400 is implemented by hardware and/or software configured to perform the method 400. In some embodiments, the steps of method 400 are performed by various hardware and/or software components residing or executing on the server system 110, the cluster storage system 115, and/or the management server 140. The order and number of steps of the method 400 are for illustrative purposes only and, in other embodiments, a different order and/or number of steps are used.

The method 400 begins when an initiating/triggering event occurs (at 405). In some embodiments, the initiating/triggering event may comprise an SLO violation, a workload (application) being added (deployed), removed, or modified, or a storage resource in the cluster being added, removed, or modified.

In some embodiments, the monitoring module/engine 330 is configured to constantly monitor each specified SLO for each workload of the cluster 115. The SLOs for the workloads may be stored, for example, in local storage 392. An SLO is considered "violated" when the minimum or maximum target value specified by the SLO is not achieved/produced for the specified SLO metric by the cluster 115 when providing data service to the workload. Upon determining a violation of a particular SLO of a particular workload, the monitoring module/engine 330 may initiate/trigger (at 410) the processes of the planner module/engine 340.

In some embodiments, a new workload (application) may be needed to be added (deployed) onto the cluster 115, the new workload requiring the data services of the cluster 115. For example, the new workload (application) may be executing on a server 110 or on a storage system 120. When a new application 112 is to be deployed that requires use of data services of the cluster 115, one or more data sets and one or more storage objects may be provisioned for use by the new application 112. When a new application 112 is to be deployed, an administrator may initiate/trigger (at 410) the processes of the planner module/engine 340. In these embodiments, the planner engine 340 may be used to select a proposed solution that specifies where to physically store the storage objects for the new application on the cluster 115 (e.g., specifies which particular aggregate of which particular storage system 120 to store the storage objects). The planner engine 340 may be initiated (at 410) to select a proposed solution for deploying the new workload whereby all SLOs of the new workload as well as all SLOs of the current workload will be achieved.

The administrator may also initiate/trigger (at 410) the processes of the planner module/engine 340 when a workload is being removed or modified, or when a storage resource in the cluster 115 is being added, removed, or modified. When adding, removing, or modifying a workload or storage resource, it is desirable to first predict the effects on the workloads on the cluster to adding, removing, or modifying the workload or storage resource. As such, in these embodiments, the planner engine 340 may be used to select a proposed solution for adding, removing or modifying a workload or storage resource in the cluster 115 whereby all SLOs of all workloads will be achieved.

In some embodiments, a foreground workload comprises a workload that caused the occurrence of the initiating event (at step 405). For example, the foreground workload may comprise the workload experiencing the SLO violation or the workload being added (deployed), removed, or modified. In these embodiments, all other workloads of the cluster 115 may be referred to as background workloads.

The method 400 initiates (at 410) the planner module/engine 340. The planner module/engine 340 then produces and evaluates/analyzes (at 415) multiple proposed states/solutions to select a proposed state/solution based on the evaluation/analysis. In some embodiments, the planner engine 340 may dynamically receive and consider/process new information for producing and evaluating the multiple proposed solutions. In these embodiments, the planner engine 340 produces a state tree comprising a plurality of proposed nodes, each proposed node representing a proposed state of the cluster storage system that is produced by implementing a proposed solution associated with the proposed state. Proposed nodes representing proposed states/solutions may be easily added or removed from the state tree based on newly received information.

Each proposed state has an associated proposed solution comprising a set of one or more actions to be taken on the cluster storage system. As such, "implementing the proposed state" may comprise implementing/executing the set of actions of the proposed solution that is associated with the proposed state. Thus, the proposed state represents the state of the cluster storage system after the associated proposed solution is implemented/executed. As used herein, the terms "proposed state" and "proposed solution" may sometimes be used interchangeably.

The planner engine 340 may initiate and use an evaluation engine 350 for evaluating each proposed state/solution. In some embodiments, the evaluation engine 350 produces an evaluation value for each proposed state/solution using an evaluation function that considers SLOs, costs, and/or optimization goals. In some embodiments, the evaluation engine 350 produces, for each proposed state/solution, a single evaluation value that represents SLO, cost, and optimization goal characteristics of the proposed state/solution. As such, each proposed state/solution is represented by a single evaluation value that is easy to process by the planner engine 340. In these embodiments, the planner engine 340 may rank the proposed states/solutions based only on the evaluation values since each evaluation value already considers SLO, cost, and optimization goal characteristics. In further embodiments, the planner engine 340 may select a proposed state/solution for implementation/execution based only on the evaluation values (e.g., select the proposed state/solution having the highest evaluation value).

The evaluation engine 350 uses an evaluation function that requires values for particular system metrics. The values of these system metrics may be predicted by a modeler engine 360 configured to model/simulate a hypothetical implementation of a proposed solution and the hypothetical resulting effects on the particular system metrics. As such, the evaluation engine 350 may initiate and use the modeler engine 360 to predict values of particular system metrics required by the evaluation function. Due to the complexity and number of factors involved in a cluster storage system, however, typical modeling engines may produce significant error in predicting these system metric values. In some embodiments, a modeler engine 360 is used that was previously trained by a modeler-training engine 370 using machine learning techniques to produce a more accurate modeler engine 360.

In summary, once initiated, the planner engine 340 produces proposed solutions/states using a state tree and may dynamically receive new information for producing and evaluating the proposed solutions/states. A planner method 500 used by the planner engine 340 is discussed below in relation to FIG. 5. The planner engine 340 may initiate and use an evaluation engine 350 to produce an evaluation value for each proposed state/solution using an evaluation function. An evaluation method 800 used by the evaluation engine 350 is discussed below in relation to FIG. 8. In turn, the evaluation engine 350 may initiate and use modeler engine 360 to predict values of particular system metrics required by the evaluation function. A modeler-training method 1000 using machine learning techniques to train the modeler engine 360 is discussed below in relation to FIG. 10. The planner engine 340 may then select a proposed state/solution based on the evaluation values. The selected proposed state/solution should achieve each SLO of the foreground workload as well as each SLO of each background workload, as well as take into consideration costs and optimization goals.

The selected proposed state/solution is then executed (at 420). As discussed above, implementing/executing a selected proposed state may comprise executing the set of actions of the proposed solution associated with the selected proposed state. By executing the set of actions of the proposed solution, a current state of the cluster storage system 115 will be changed to the selected proposed state. Note also that each state has an associated set of configuration settings. The current state has an associated set of configuration settings that are the current configuration settings of the cluster 115. Each proposed state also has an associated set of configuration settings that will be the configuration settings of the cluster 115 if the proposed state is implemented.

The planner engine 340 may include a task sub-engine, which develops a list of tasks that is to be executed by the cluster in order to carry out the selected proposed solution. Once these tasks are generated by the task sub-engine, a dependency sub-engine may generate a set of dependencies between these tasks. The set of dependencies is used, for example, to ensure that data is only deleted when no component in the system has any further need of it. After the list of tasks and the associated set of dependencies have been generated, the execution engine modifies the storage network in accordance with the selected solution. As an example, the selected solution may include re-allocating available storage space between two volumes on the cluster 115. In this case, the tasks identified by the task sub-engine could include (1) confirming available space in the first volume, (2) reducing the space allocated to the first volume, and (3) increasing the space allocated to the second volume by an equal amount. The dependency sub-engine would then determine dependencies so that these tasks are executed in the proper order (i.e. 1, 2, 3).

The method 400 then ends. The method 400 may be repeated each time an initiating/triggering event occurs at step 405.

IV. PLANNER ENGINE

As discussed above, when triggered at step 415 of the method 400, the planner engine 340 produces and evaluates/analyzes multiple proposed states/solutions for selecting a proposed state/solution for implementation. The planner engine 340 may do so by producing a state tree comprising a plurality of proposed nodes, each proposed node representing a proposed state of the cluster storage system that is produced by implementing a proposed solution associated with the proposed state. Proposed nodes representing proposed states/solutions may be dynamically added or removed from the state tree based on newly received information.

Figure 5:
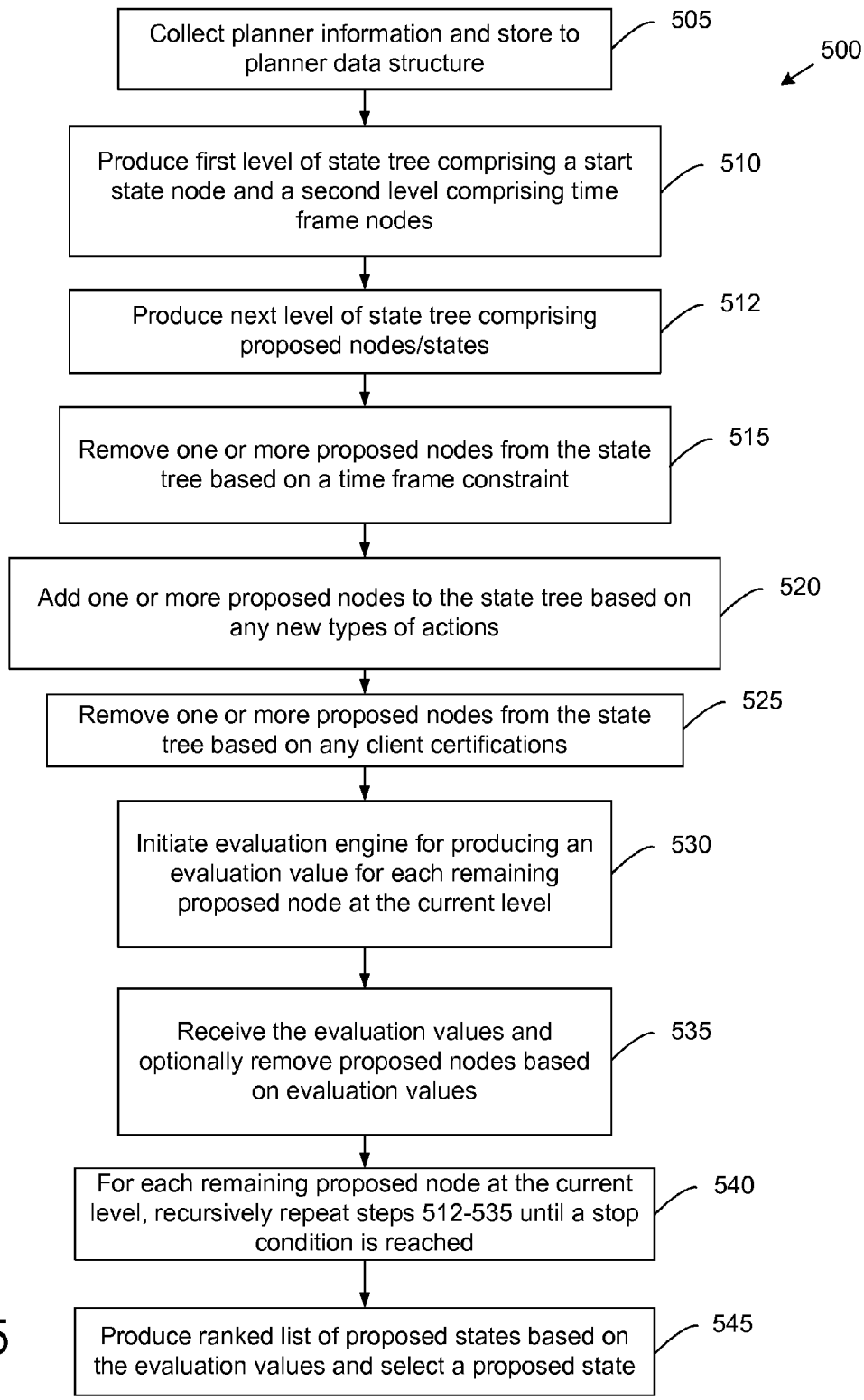
FIG. 5 is a flowchart of a planner method for producing and evaluating multiple proposed states/solutions using a state tree.

FIG. 5 is a flowchart of a planner method 500 for producing and evaluating multiple proposed states/solutions using a state tree. In some embodiments, the method 500 is implemented by hardware and/or software configured to perform the method 500. In some embodiments, the steps of method 500 are performed by various hardware and/or software components residing or executing on the server system 110, the cluster storage system 115, and/or the management server 140. In some embodiments, the steps of method 500 are performed by the planner engine 340. The order and number of steps of the method 500 are for illustrative purposes only and, in other embodiments, a different order and/or number of steps are used. FIG. 5 is described in relation to FIG. 6 (showing a planner data structure) and FIGS. 7A-G (showing producing and processing steps performed on a state tree).

The method 500 may be triggered, for example, by an SLO violation, a workload (application) being added (deployed), removed, or modified, or a storage resource in the cluster being added, removed, or modified. A foreground workload comprises the workload that triggers the planner method 500 described herein. For example, the foreground workload may comprise the workload experiencing the SLO violation or a workload being added (deployed), removed, or modified. All other workloads of the cluster 115 may be referred to as background workloads.

As a preparation step that may occur prior to or after the planner engine 340 is triggered, the method 500 may receive (at 502) new planner information (e.g., from an administrator or program). As discussed below, new planner information comprises planner information that was not part of the original hardware or software coding of the planner module/engine 340 and may be received to dynamically reconfigure the processes of the planner engine 340. The new planner information may be stored to local storage 392.

Figure 6:
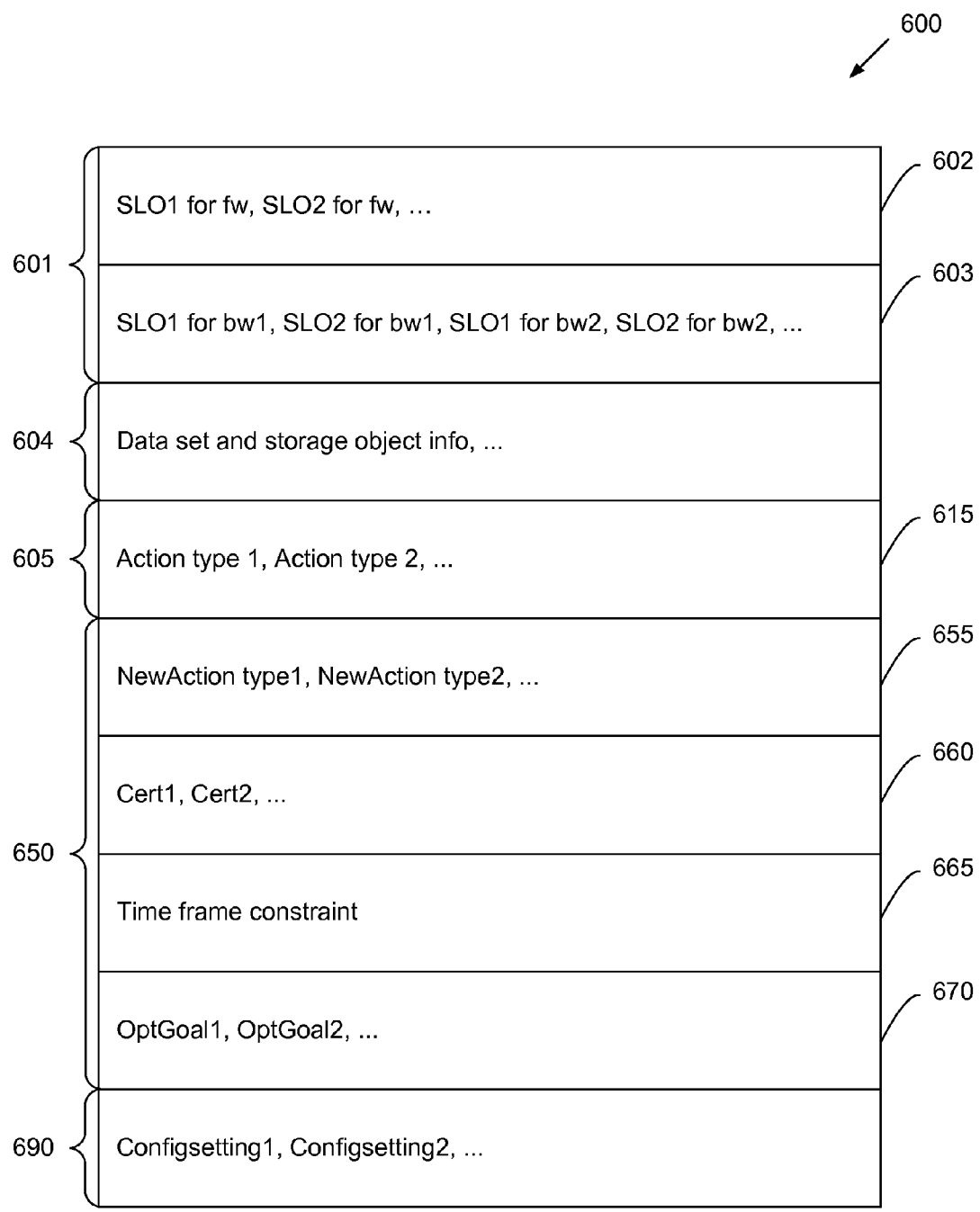
FIG. 6 shows a conceptual diagram of an exemplary planner data structure storing exemplary planner information.

The method 500 then collects (at 505) cumulative planner information needed by the method 500 and stores the cumulative planner information to a planner data structure. FIG. 6 shows a conceptual diagram of an exemplary planner data structure 600 storing exemplary cumulative planner information. The planner data structure 600 may be stored, for example, to the local storage 392 and loaded to memory 328.

As shown in FIG. 6, the cumulative planner information may comprise SLO information 601 for the workloads of the cluster 115. The SLO information 601 may comprise foreground SLO information 602 and background SLO information 603. The foreground SLO information 602 may comprise one or more SLOs specified for the foreground workload ("fw"), such as SLO1 for fw, SLO2 for fw, etc. The background SLO information 603 may comprise one or more SLOs specified for each background workload ("bw"), such as SLO1 for bw1, SLO2 for bw1, SLO1 for bw2, SLO2 for bw2, etc. If the triggering event is an SLO violation, the foreground workload comprises the workload having the violated SLO. The SLOs of the foreground and background workloads may be previously stored and retrieved from the local storage 392 and stored to the planner data structure 600. If the triggering event is deploying a new workload, the foreground workload comprises the new workload. The SLOs of the background workloads may be retrieved from the local storage 392 and stored to the planner data structure 600. Also, the SLOs of the foreground workload may be received from the administrator and stored to the planner data structure 600.

In addition, for deployment of a new workload, the cumulative planner information may also comprise new workload information 604. The new workload information 604 may comprise information regarding data set(s) and storage object(s) provisioned for the new workload. For example, the new workload information 604 may include the types of data sets (e.g., email data set, etc.) provisioned for the new workload, identifiers for the storage object(s) or data size of the storage object(s) provisioned for the new workload, etc. The new workload information 604 of the foreground workload may be received from the administrator and stored to the planner data structure 600.

As shown in FIG. 6, the planner information may also comprise original planner information 605 and new planner information 650. The original planner information may comprise planner information with which the planner module/engine 340 was originally configured. For example, the original planner information may be part of the original hardware or software coding of the planner module/engine 340. In contrast, the new planner information may comprise planner information that was not part of the original hardware or software coding of the planner module/engine 340. Rather, the new planner information may be newly received (e.g., from an administrator or program) for dynamically reconfiguring the processes of the planner module/engine 340. In some embodiments, the original planner information 605 may comprise original types of actions 615 that are permitted and may be included in a proposed state/solution. Examples of types of actions include throttling, migrating a storage object, compressing or deduplicating a storage object, etc.

In some embodiments, the new planner information 650 may comprise zero or more new types of actions 655 that were not originally permitted and now may be included in a proposed state/solution. In some embodiments, the new types of actions 655 do not replace or supplant the original types of actions 615 but are added as additional types of actions that may be included in proposed state/solution. The new types of actions 655 may be used to dynamically add new proposed nodes to the state tree.

In some embodiments, the new planner information 650 may additionally comprise zero or more client configuration certifications 660. A client may comprise a user or enterprise using the cluster 115 for data services. The client may sometimes be referred to as a customer or vendor. In some embodiments, a client may have previously performed their own analysis on particular cluster states and associated configuration settings of the cluster 115 that achieve particular SLOs specified for their workloads. In these embodiments, a client may submit one or more client configuration certifications 660, each client configuration certification 660 declaring/certifying that a particular state of the cluster will achieve one or more specified SLOs of the client's workloads on the cluster 115.

The client certification 660 may describe the particular state in terms of the configuration settings of the cluster that is associated with the particular state. For example, a first client certification 660 may specify that a first set of configuration settings of the cluster will achieve SLO1 and SLO2 of all client workloads on the cluster and a second client certification 660 may specify that a second set of configuration settings of the cluster will achieve SLO1 and SLO3 of all client workloads on the cluster. As such, client certifications 660 represent cluster configuration settings that have been approved by the client/customer. The client certifications 660 may be used to dynamically remove proposed nodes/states of the state tree. In some embodiments, if one or more client certifications 660 have been received and are stored to the planner data structure 600, only the proposed states that are in compliance and are consistent with the one or more client certifications 660 are retained in the state tree and all other proposed states are removed.

In some embodiments, the new planner information 650 may comprise a time frame constraint 665. The time frame constraint 665 may specify a desired time frame that a proposed solution can be implemented/executed. In some embodiments, a time frame constraint 665 may specify at least two different time frame periods that a proposed solution can be executed, a first time frame period being shorter than a second time frame period. In some embodiments, a time frame constraint 665 may specify a short, medium, or long time frame period that a proposed solution can be executed. Each proposed solution typically specifies a type of action and each type of action is able to be executed within a particular amount of time. In some embodiments, proposed solutions and action types may be classified/divided into a plurality of groups (e.g., short, medium, or long groups) based on the time frame period that the proposed solutions and action types can be executed. Each proposed nodes in the state tree can likewise be so classified/divided based on the proposed solution that the proposed node represents. For example, a time frame constraint 665 that specifies a short time frame period is specifying that only those solutions with a type of action that can be executed within the short amount of time should be considered.

Examples of solutions that may be executed within the short time frame include throttling based solutions. Examples of solutions that may be executed within the medium time frame include storage object movement/migration based solutions. For example, moving one or more volumes to different aggregates in the cluster. Examples of solutions that may be executed within the long time frame include additional storage resource provisioning (extra data capacity provisioning) based solutions. For example, adding new processors, storage devices, or storage systems to the cluster 115.

The time frame constraint 665 may be used to dynamically remove proposed nodes/states of the state tree. In some embodiments, if a time frame constraint 665 has been received and is stored to the planner data structure 600, only the proposed states that are in compliance and are consistent with the time frame constraint 665 are retained in the state tree and all other proposed states are removed.

The new planner information 650 may also comprise zero or more new optimization goals 670 that specify a desired objective relating to a cost that is preferred for a selected state/solution. Each optimization goal 670 may also include a weight that specifies the relative level of importance of the optimization goal. As such, each optimization goal 670 may specify an objective relating to a specific cost (e.g., lower power consumption) and a weight (e.g., 0.5) representing the importance of the objective. In some embodiments, optimization goals 670 may be used to dynamically modify an evaluation function used by the evaluation engine 350 (as discussed below in Section V).

As such, as described above, new information 650 may be received to dynamically change processes of the planner engine 340 to dynamically change the way proposed solutions are produced and evaluated. The new information 650 may include new action types 655 that may be used to add proposed nodes/states to the state tree, new client certifications 660 that may be used to add remove proposed nodes/states from the state tree, time frame constraint 665 that may be used to remove proposed nodes/states from the state tree, and/or optimization goals 670 that may be used to modify an evaluation function used by the evaluation engine 350. In some embodiments, all, none, or any combination of the above types of new information 650 may be received and stored to the planner data structure 600. The planner engine 340 may respond accordingly depending on which types of new information 650 are stored to the planner data structure 600.

As shown in FIG. 6, the planner information 600 may also comprise current configuration settings 690. The current configuration settings 690 may describe configuration settings of the current state of the cluster 115. The current cluster configuration settings 690 may be used to determine and produce a start state of the state tree.

Figure 7A:
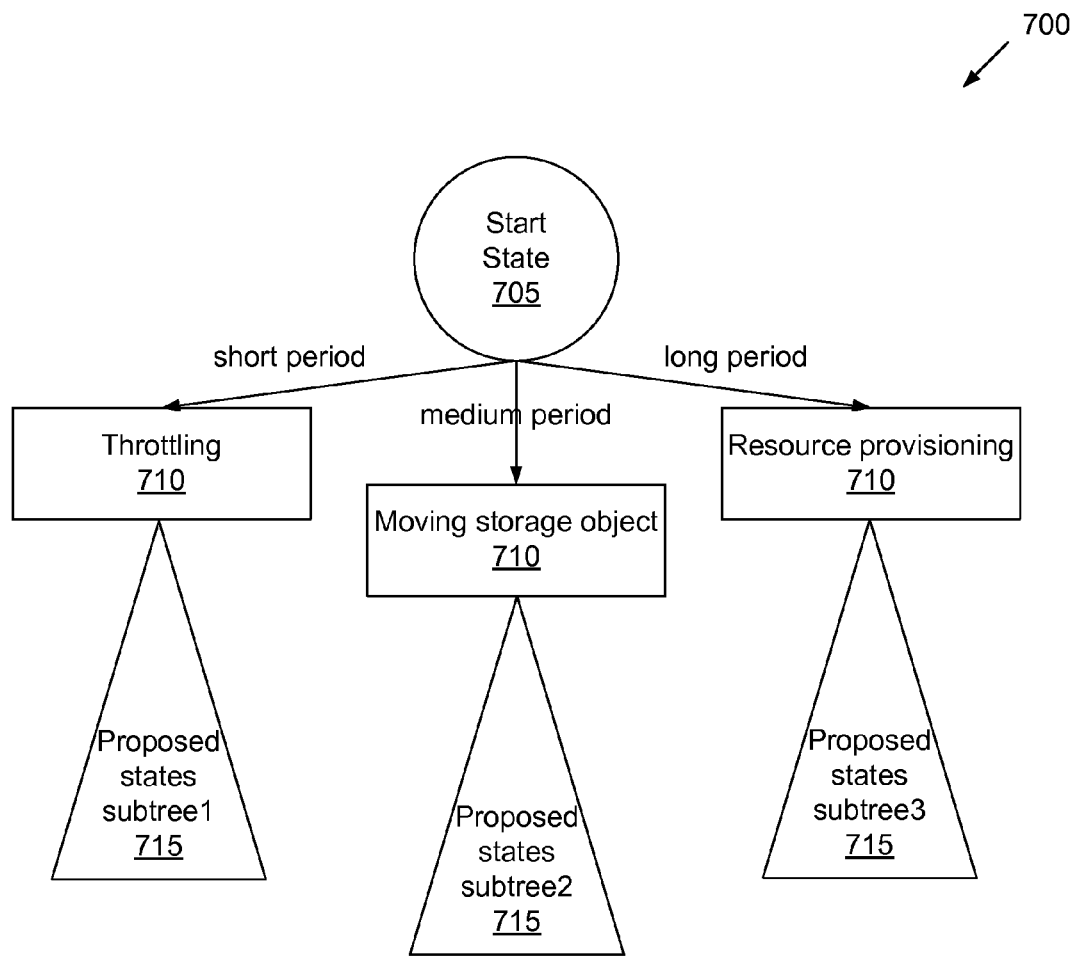
FIGS. 7A-G conceptually illustrate producing and processing steps performed on a state tree.

The method 500 then produces (at 510) first and second levels of a state tree. FIG. 7A shows a conceptual diagram of an exemplary state tree 700 used in some embodiments. The state tree 700 comprises a plurality of nodes arranged in a plurality of hierarchical levels. A first level may comprise a start node 705 representing a current state of the cluster storage system 115. A second level may comprise a plurality of time nodes 710, each time node representing a time frame.

At the first level of the state tree 700, the start node 705 represents a start state comprising the current state of the cluster storage system 115 when the planner engine 340 is initiated. For example, the start state may comprise the state of the cluster when an SLO violation is detected for a foreground workload, or when a new foreground workload is to be deployed on the cluster. The start state may be determined using the current configuration settings 690 stored in planner data structure 600.

At the second level of the state tree 700, each time node 710 represents a time frame constraint for proposed states/solutions. In the example of FIG. 7A, the time nodes 710 represent short, medium, and long time frame constraints. In other embodiments, however, the second level comprises a different number of time nodes 710. Examples of solutions that meet each time constraint are also shown (e.g., throttling for the short time frame, moving storage objects for the medium time frame, and additional storage resource provisioning). In other embodiments, however, other solutions that meet each time constraint may be used.

The method 500 then produces (at 512) a next level (e.g., third level) of the state tree 700. In some embodiments, each level in the state tree 700 below the second level may comprise a plurality of proposed nodes 715, each proposed node representing a proposed state of the cluster storage system. A proposed node may represent a proposed state produced by hypothetically implementing a proposed solution associated with the proposed state, thereby changing the current start state of the cluster to the proposed state.

At the first iteration of the method 500, the next level may comprise a third level of proposed nodes 715. The plurality of proposed nodes 715 at the third level may be divided into a plurality of groups, each group of proposed nodes comprising a sub-tree of a corresponding time node 710 and representing proposed states capable of being implemented within the time frame specified by the corresponding time node 710. In the example of FIG. 7A, the third level comprises a sub-tree1 of proposed nodes 715 for the short time frame node 710, a sub-tree2 of proposed nodes 715 for the medium time frame node 710, and a sub-tree3 of proposed nodes 715 for the long time frame node 710.

In some embodiments, each proposed node 715 of the initial state tree is produced using original types of actions 615 stored in the planner data structure 600. The original types of actions 615 may specify types of actions that are permitted and may be included in a proposed solution/state and which the planner engine 340 may use to produce the various proposed solutions/states in the state tree for consideration.

The method 500 then removes (at 515) one or more proposed nodes 715 from the current level of the state tree 700 based on a time frame constraint 665 specified and stored in the planner data structure 600. In some embodiments, if a time frame constraint 665 has been received and is stored to the planner data structure 600, only the proposed nodes/states 715 that are in compliance and are consistent with the time frame constraint 665 are retained in the state tree 700 and all other proposed states 715 are removed from the state tree 700. A proposed node/state 715 is in compliance with a time frame constraint 665 when the proposed solution associated with the proposed node/state 715 may be executed within the time period specified in the time constraint 665.

Figure 7B:
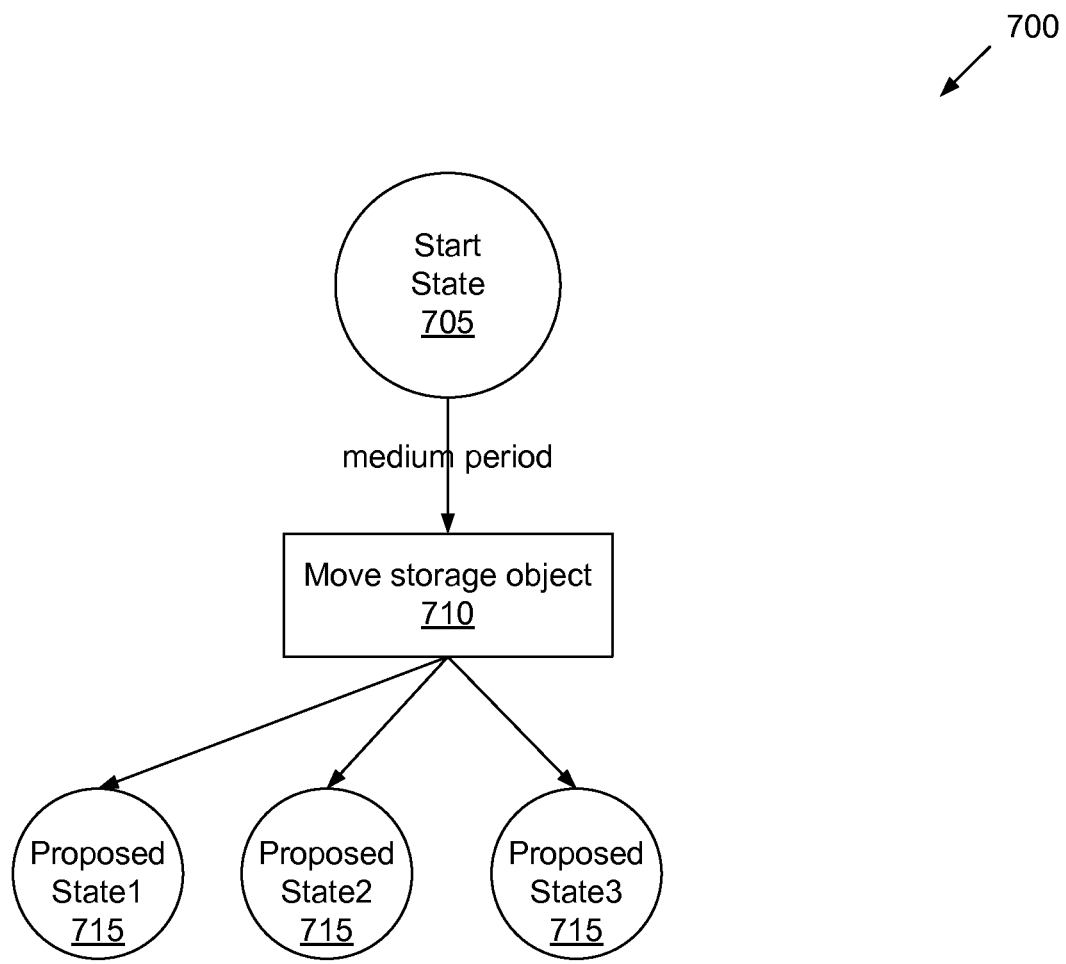

FIG. 7B shows a conceptual diagram of removing proposed nodes 715 from the state tree 700 based on a time frame constraint 665. In the example of FIG. 7B, the time frame constraint 665 specifies the medium time frame where, e.g., solutions comprising moving storage objects are in compliance with the medium time frame. As such, the proposed nodes 715 of the sub-tree1 under the short time frame node 710 and the proposed nodes 715 of the sub-tree3 under the long time frame node 710 are removed. Thus only the proposed nodes 715 of the sub-tree2 under the medium time frame node 710 are retained. In the example of FIG. 7B, sub-tree2 under the medium time frame node 710 comprises proposed nodes/states 1-3.

Figure 7C:
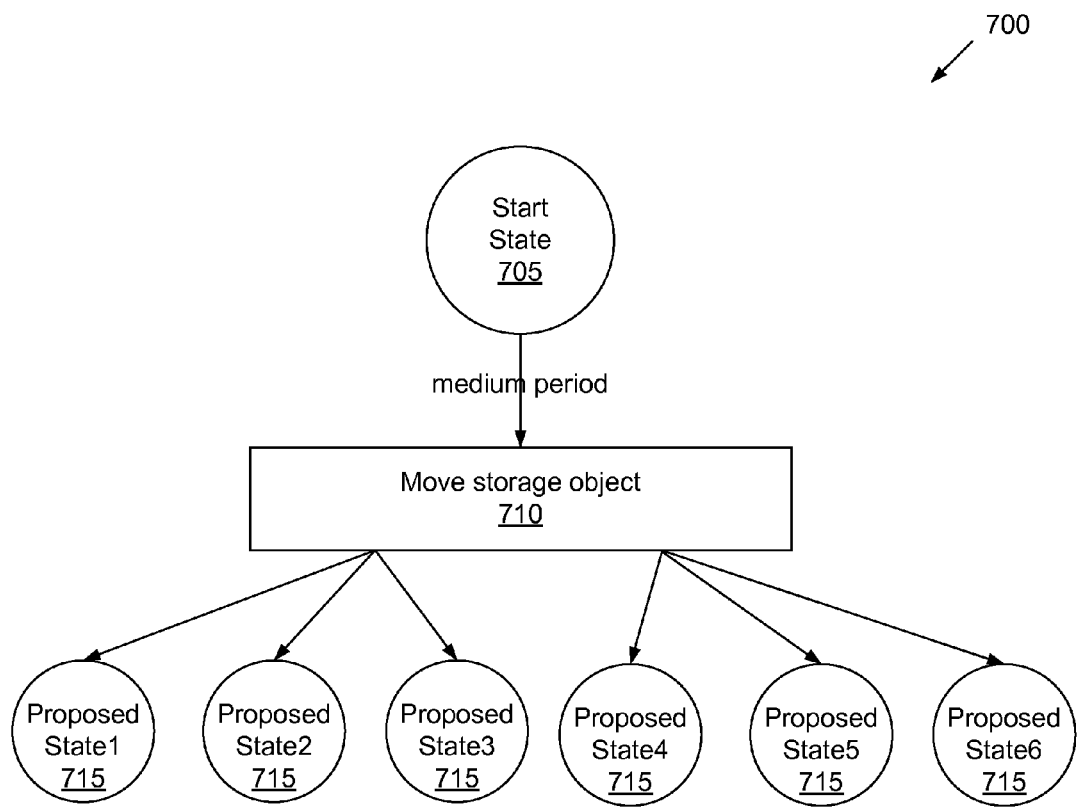

The method 500 then adds (at 520) one or more proposed nodes 715 to the current level of the state tree 700 based on any new types of actions 655 specified and stored in the planner data structure 600. The new types of actions 655 may specify types of actions that are now permitted and may be included in a proposed solution/state and which the planner engine 340 may use to produce one or more new proposed nodes/states 715 in the state tree 710 for consideration. FIG. 7C shows a conceptual diagram of adding proposed nodes 715 to the state tree 700 based on new types of actions 655. In the example of FIG. 7C, the new types of actions 655 are used by the planner engine to produce new proposed nodes/states 4-6 in sub-tree2 under the medium time frame node 710.

The method 500 then removes (at 525) one or more proposed nodes 715 from the current level of the state tree 700 based on any client certifications 660 specified and stored in the planner data structure 600. In some embodiments, if any client certifications 660 have been received and is stored to the planner data structure 600, only the proposed states that are in compliance and are consistent with the one or more client certifications 660 are retained in the state tree and all other proposed states are removed. In particular, if an SLO specified in a client certification 660 is also specified for any workload in the cluster 115, only the proposed states having configuration settings that match the configuration settings specified in the client certification 660 may be retained, while all other proposed states having configuration settings that do not match may be removed from the state tree 700.

Figure 7D:
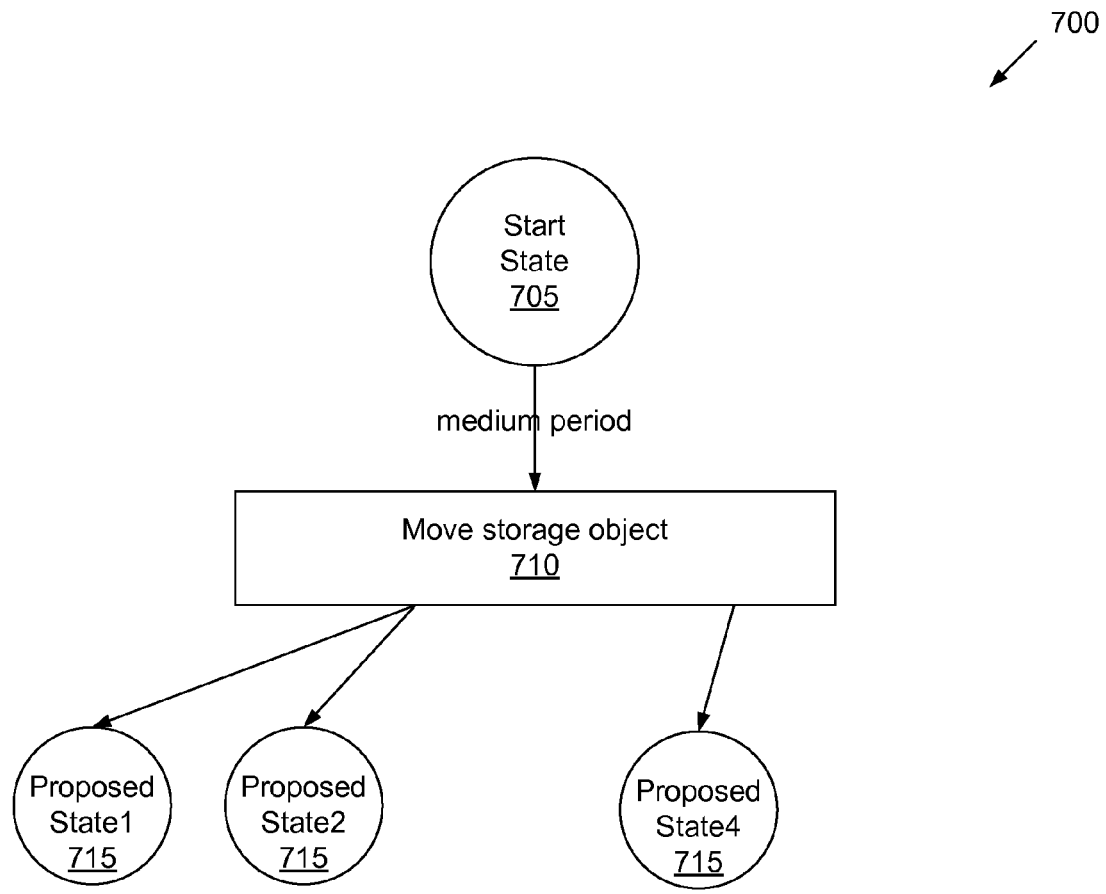

FIG. 7D shows a conceptual diagram of removing proposed nodes 715 from the state tree 700 based on client certifications 660. In the example of FIG. 7D, a first client certification 660 may specify that a first set of configuration settings of the cluster will achieve SLO1 and SLO2 of all client workloads on the cluster, a second client certification 660 may specify that a second set of configuration settings of the cluster will achieve SLO1 and SLO3 of all client workloads on the cluster, and a third client certification 660 may specify that a third set of configuration settings of the cluster will achieve SLO1 and SLO4 of all client workloads on the cluster. In the example of FIG. 7D, SLO1 is specified for at least one workload of the cluster, and SLO2-4 are not specified for any workload of the cluster. As such, each proposed state 715 in the state tree 700 should achieve SLO1. The client certifications 660 declare that a proposed state having associated configuration settings matching the first, second, or third set of configuration settings will achieve SLO1 for the workloads of the cluster. In the example of FIG. 7D, proposed nodes/states 1, 2, and 4 have associated configuration settings matching the first, second, or third set of configuration settings and are retained in the state tree. Proposed nodes/states 3, 5, and 6 have associated configuration settings that do not match the first, second, or third set of configuration settings and thus are removed from the state tree.

The method 500 then initiates (at 530) an evaluation module/engine 350 for producing an evaluation value for each remaining proposed state 715 at the current level in the state tree 700. In some embodiments, the evaluation engine 350 produces an evaluation value for each remaining proposed state at the current level using an evaluation function that considers SLOs, costs, and/or optimization goals. In some embodiments, the evaluation engine 350 produces, for a proposed state/solution, a single evaluation value that represents SLO, cost, and optimization goal characteristics of the proposed state/solution. As such, each proposed state/solution may be represented by a single evaluation value that is easy to process by the planner engine 340. In some embodiments, a first proposed state having a higher evaluation value than a second proposed state indicates that, in the overall balance of these three factors, the first proposed state better achieves the SLOs of the workloads of the cluster and the specified optimization goals at a better cost than the second proposed state. An evaluation method 800 used by the evaluation engine 350 is discussed below in relation to FIG. 8. In other embodiments, a conventional evaluation engine 350 may be used to produce evaluation values for the remaining proposed states.

The method 500 receives (at 535) an evaluation value for each remaining proposed state at the current level from the evaluation module/engine 350 and may optionally remove one or more proposed states based on received evaluation values. For example, the method 500 may remove all proposed states having an evaluation value below a predetermined threshold value (e.g., remove all proposed states having a negative evaluation value). As another example, the method 500 may remove proposed states having lower evaluation values relative to other proposed states (e.g., remove the proposed state having the lowest evaluation value).

Figure 7E:
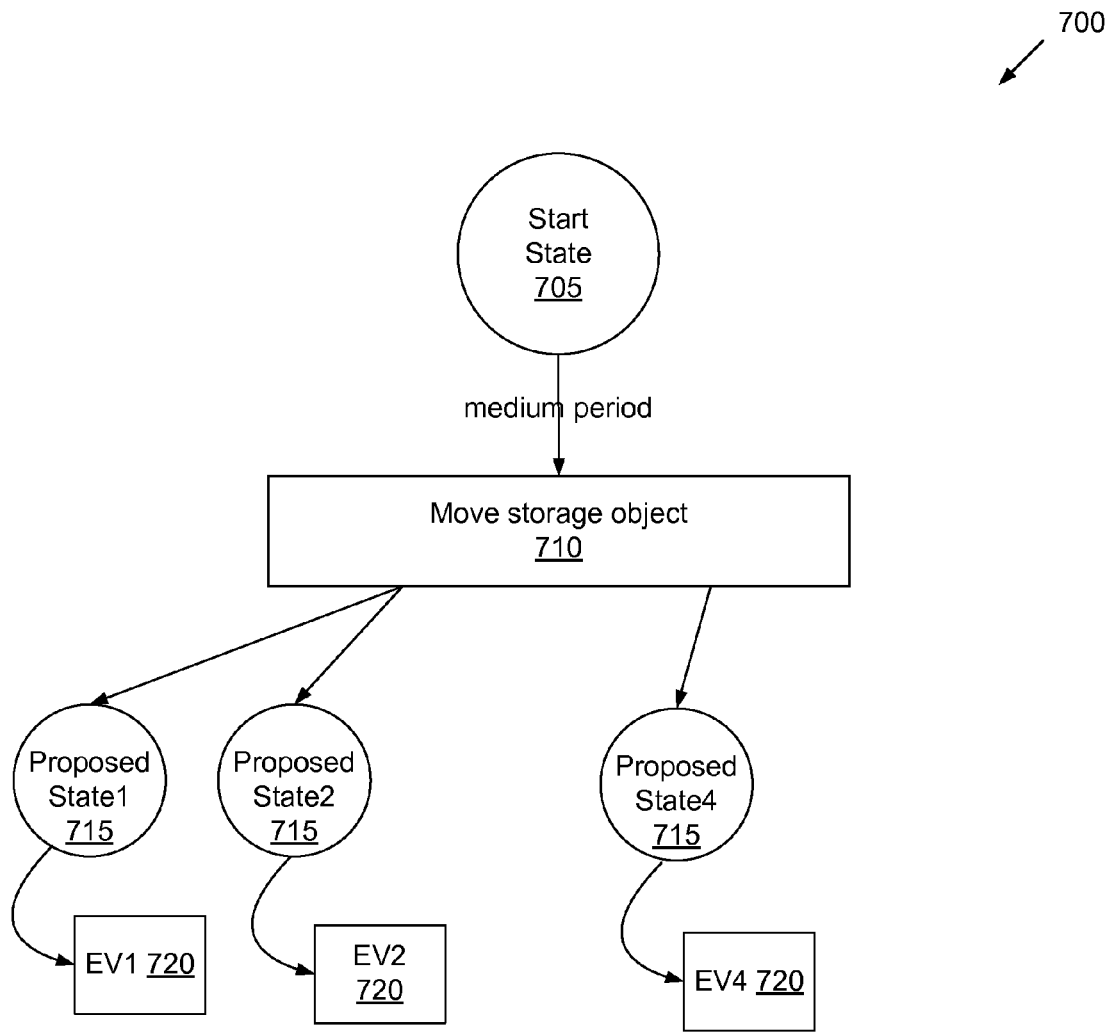
Figure 7F:
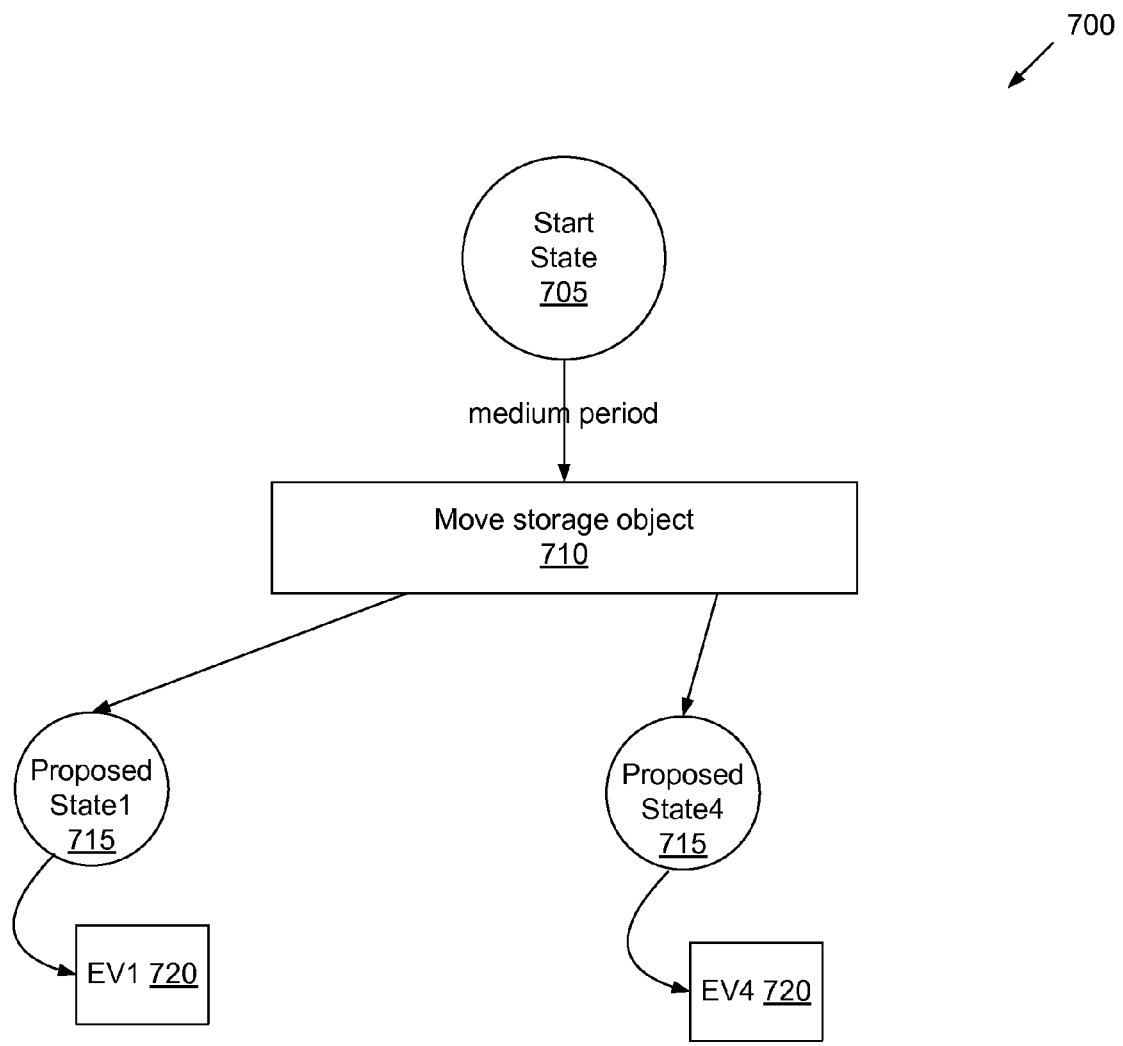

FIG. 7E shows a conceptual diagram of receiving evaluation values for each remaining proposed node 715 in the state tree 700. In the example of FIG. 7E, proposed nodes/states 1, 2, and 4 each receive an evaluation value 720 (EV1, EV2, and EV4, respectively). FIG. 7F shows a conceptual diagram of removing proposed nodes 715 from the state tree 700 based received evaluation values 720. In the example of FIG. 7F, proposed node/state 2 is removed from the state tree 700 based on its evaluation value EV2 (e.g., EV2 was a negative value or was lower relative to EV1 and EV4).

For each remaining proposed node 715 at the current level, the method 500 may then recursively repeat (at 540) steps 512-535 until a predetermined stop condition is reached. For example, for each remaining proposed node 715 steps 512-535 may be repeated to produce a sub-tree under the remaining proposed node 715 comprising a next level of proposed nodes, whereby proposed nodes are added or removed based on new information 650 in the planner data structure 600. The method 500 may perform step 540 using recursive search procedures known in the art. For example, the method 500 may perform step 540 using a breadth-first recursive search procedure. In other embodiments, other recursive search procedures may be used. At each remaining proposed node in the state tree 700, the method 500 may maintain a set of "better" proposed states having higher evaluation values than the remaining proposed node. The predetermined stop condition may be based on the cardinality of the set of "better" proposed states. As known in the art, the cardinality of a set is the number of elements of the set. In some embodiments, the recursive procedure of step 540 may terminate when the set becomes empty and the cardinality equals 0. The progress of the recursive procedure of step 540 may be assured by proceeding with the next iteration only when there are "better" proposed states to reach.

Figure 7G:
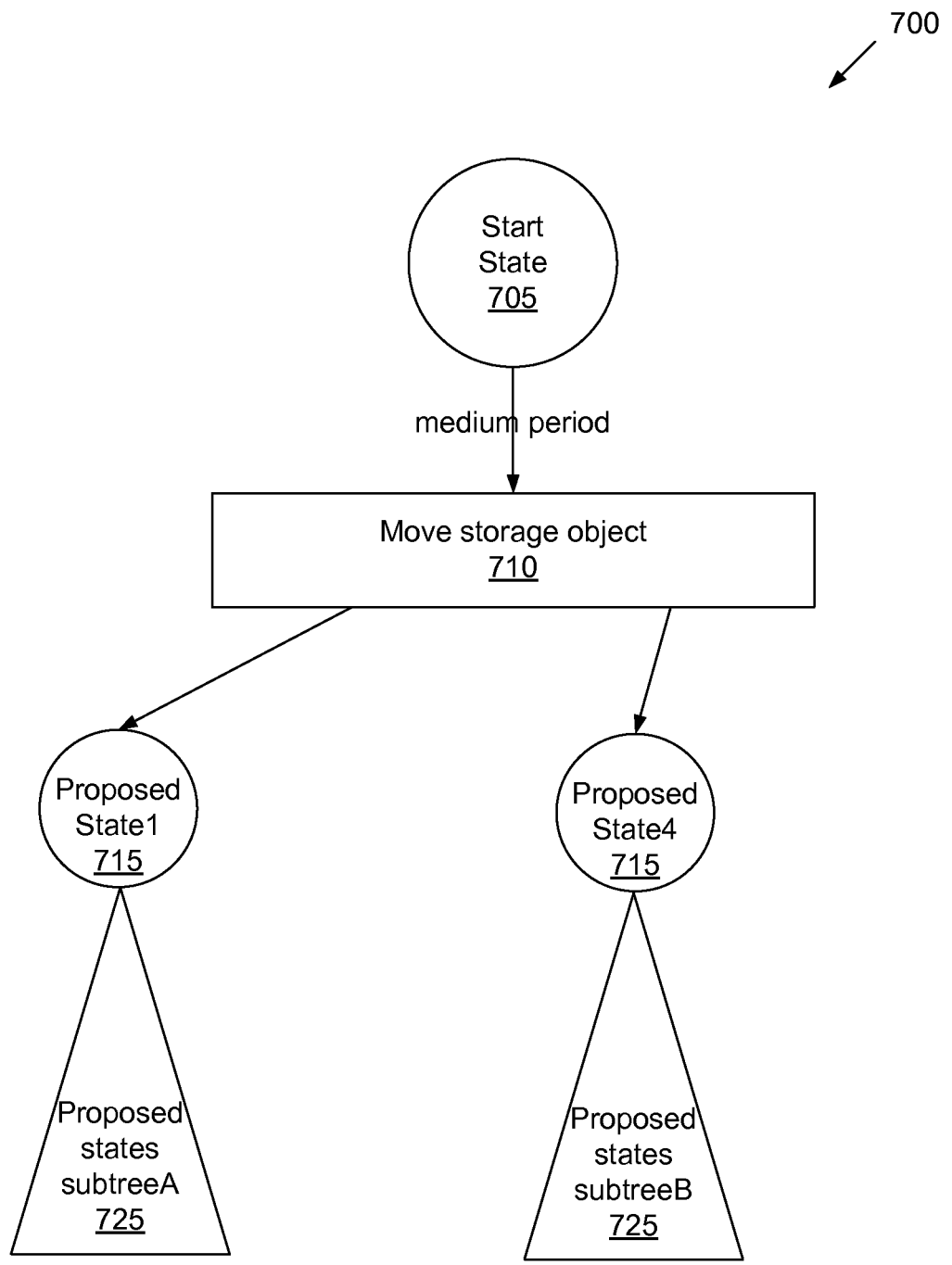

FIG. 7G shows a conceptual diagram of an exemplary state tree 700 having sub-trees of proposed nodes 725 produced for each remaining proposed node 715 in the third level. In the example of FIG. 7G, sub-tree A is produced for proposed state1 and sub-tree B is produced for proposed state2, where sub-tree A and B reside at a fourth level of the state tree 700.

The method 500 then produces (at 545) a ranked list of all proposed states remaining in the state tree 700 based on the evaluation values and selects a proposed state for implementation/execution. In some embodiments, the evaluation engine 350 produces a single evaluation value for each proposed state, the single evaluation value reflecting SLOs, costs, and optimization goals characteristics of the proposed state. In these embodiments, the planner engine 340 may rank the proposed states based only on the evaluation values and select the proposed state for execution based only on the evaluation values. For example, the evaluation engine 350 may select the proposed state having the highest evaluation value. As such, the proposed state having the best overall balance of achieving the SLOs of the workloads of the cluster and the optimization goals at a lower cost may be selected. In other embodiments, a conventional evaluation engine may be used to produce evaluation values for the remaining proposed states. In these embodiments, the administrator may select the proposed state from the ranked list of proposed states.

The method 500 then ends. The proposed solution associated with the selected proposed state may then be sent to the execution engine 380 which then executes the proposed solution (at step 420 of method 400).

V. EVALUATION ENGINE

Typically, an evaluation engine may evaluate a proposed solution using various evaluation functions. The evaluation functions produce values predicted to be produced by the proposed solution for various storage system metrics. These evaluation values may be used to evaluate the proposed solution, for example, by a system administrator. Typically the evaluation engine produces evaluation values for each proposed solution that may be difficult to analyze for determining the desirability of each proposed solution. Also, typically the evaluation engine is configured to use particular evaluation functions to produce values for particular metrics and the planner engine is configured to receive values for the particular metrics and process them accordingly. As such, the evaluation functions used by the evaluation engine are typically static and difficult to modify as the evaluation engine and the planner engine would need to be heavily modified to change the evaluation functions.

In some embodiments, an evaluation engine 350 is used that produces an evaluation value for each proposed state/solution using an evaluation function that considers SLOs, costs, and/or optimization goals. In some embodiments, the evaluation engine 350 produces, for each proposed state/solution, a single evaluation value that represents SLO, cost, and optimization goal characteristics of the proposed state/solution. For example, a first proposed state/solution having a higher evaluation value than a second proposed state/solution indicates that, in the overall balance of these three factors, the first proposed state/solution better achieves the SLOs and the optimization goals of the workloads of the cluster at lower cost than the second proposed state/solution.

As described above, each proposed state/solution is represented by a single evaluation value that is easy to process by the planner engine 340. As such, if needed, the evaluation function may be dynamically changed without needing to otherwise modify the evaluation engine 350 or the planner engine 340. Since the new evaluation function will still produce a single evaluation value for each proposed state/solution, the evaluation engine 350 will still send a single evaluation value for each proposed state/solution to the planner engine 340. And the processes of the planner engine 340 will still be processing a single representative evaluation value for each proposed state/solution and will not need to be modified. Thus the SLOs, costs, and/or optimization goals considered/included in the new evaluation function may be continually modified as needed without otherwise modifying the evaluation engine 350 or the planner engine 340.

In these embodiments, the planner engine 340 may then rank the proposed states/solutions based only on the evaluation values since each evaluation value already considers SLO, cost, and optimization goal characteristics. In further embodiments, the planner engine 340 or administrator may then select a proposed state/solution for implementation/execution based only on the evaluation values (e.g., select the proposed state/solution having the highest evaluation value).

In particular, to produce a final evaluation value for a proposed state/solution, the evaluation engine 350 may determine a set of service level objective (SLO) evaluation values for the proposed solution (each SLO evaluation value indicating a degree to which the proposed solution achieves the target value of the SLO metric specified in the SLO), determine a set of cost evaluation values for the proposed solution (each cost evaluation value being based on a cost value of a cost metric, the cost value predicted to be produced by executing the set of actions of the proposed solution), and produce a final evaluation value for the proposed solution by applying an evaluation function to the set of SLO evaluation values and the set of cost evaluation values. In some embodiments, the evaluation function may apply a set of cost weights to the set of cost evaluation values and/or apply a set of SLO weights to the set of SLO evaluation values.

Figure 8:
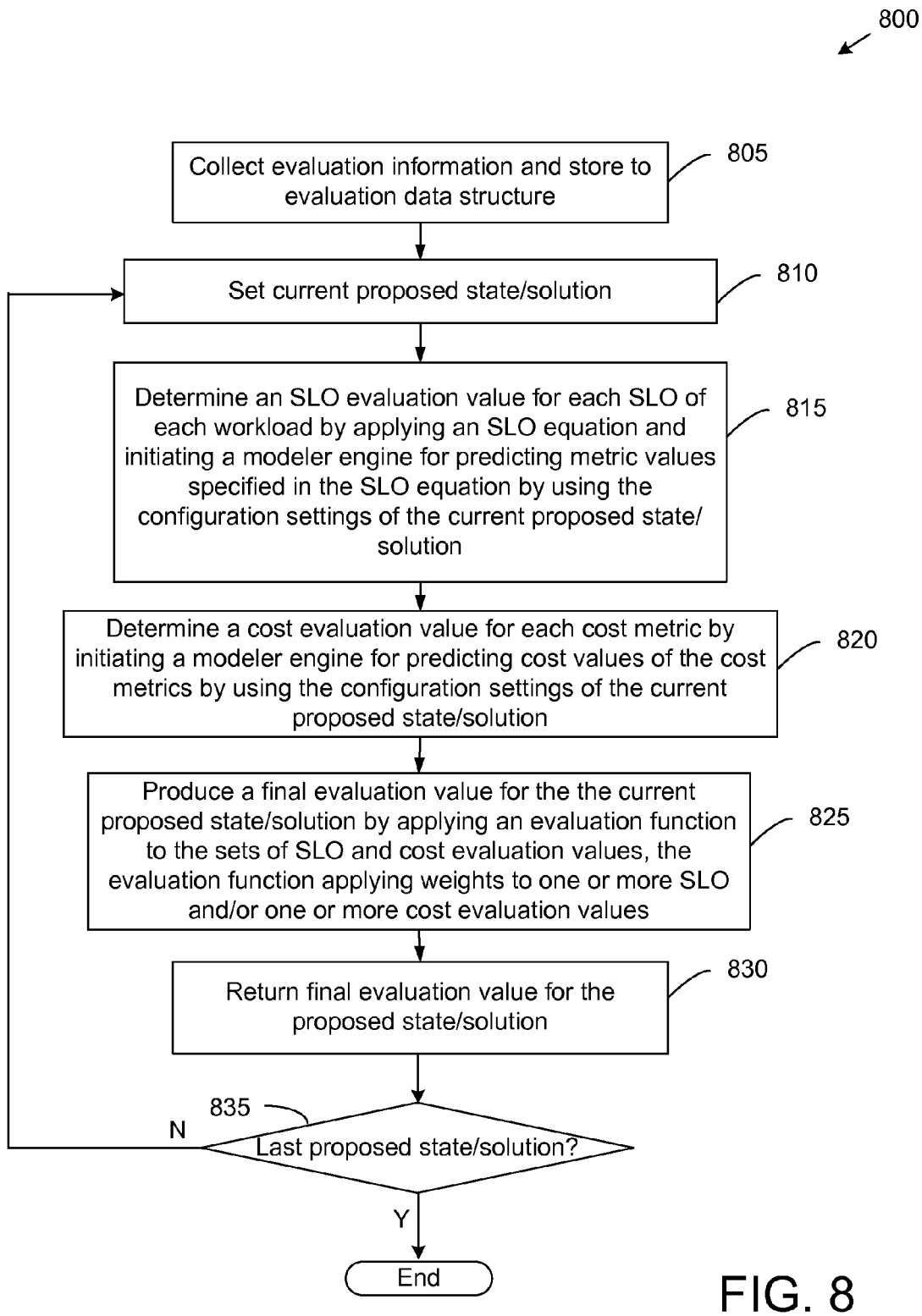
FIG. 8 is a flowchart of an evaluation method for evaluating proposed states/solution.

FIG. 8 is a flowchart of an evaluation method 800 for evaluating proposed states/solutions. In some embodiments, the method 800 is implemented by hardware and/or software configured to perform the method 800. In some embodiments, the steps of method 800 are performed by various hardware and/or software components residing or executing on the server system 110, the cluster storage system 115, and/or the management server 140. In some embodiments, the steps of method 800 are performed by the evaluation engine 350. The order and number of steps of the method 800 are for illustrative purposes only and, in other embodiments, a different order and/or number of steps are used. FIG. 8 is described in relation to FIG. 9 (showing an evaluation data structure 900).

The method 800 may be triggered, for example, by the planner engine 340 at step 530 of the planner method 500. In these embodiments, the method 800 may comprise step 530 of the planner method 500 and produce an evaluation value for each remaining proposed node/state at the current level of the state tree 700. In other embodiments, a conventional planner engine may initiate the method 800 for producing an evaluation value for one or more proposed solutions.

Figure 9:
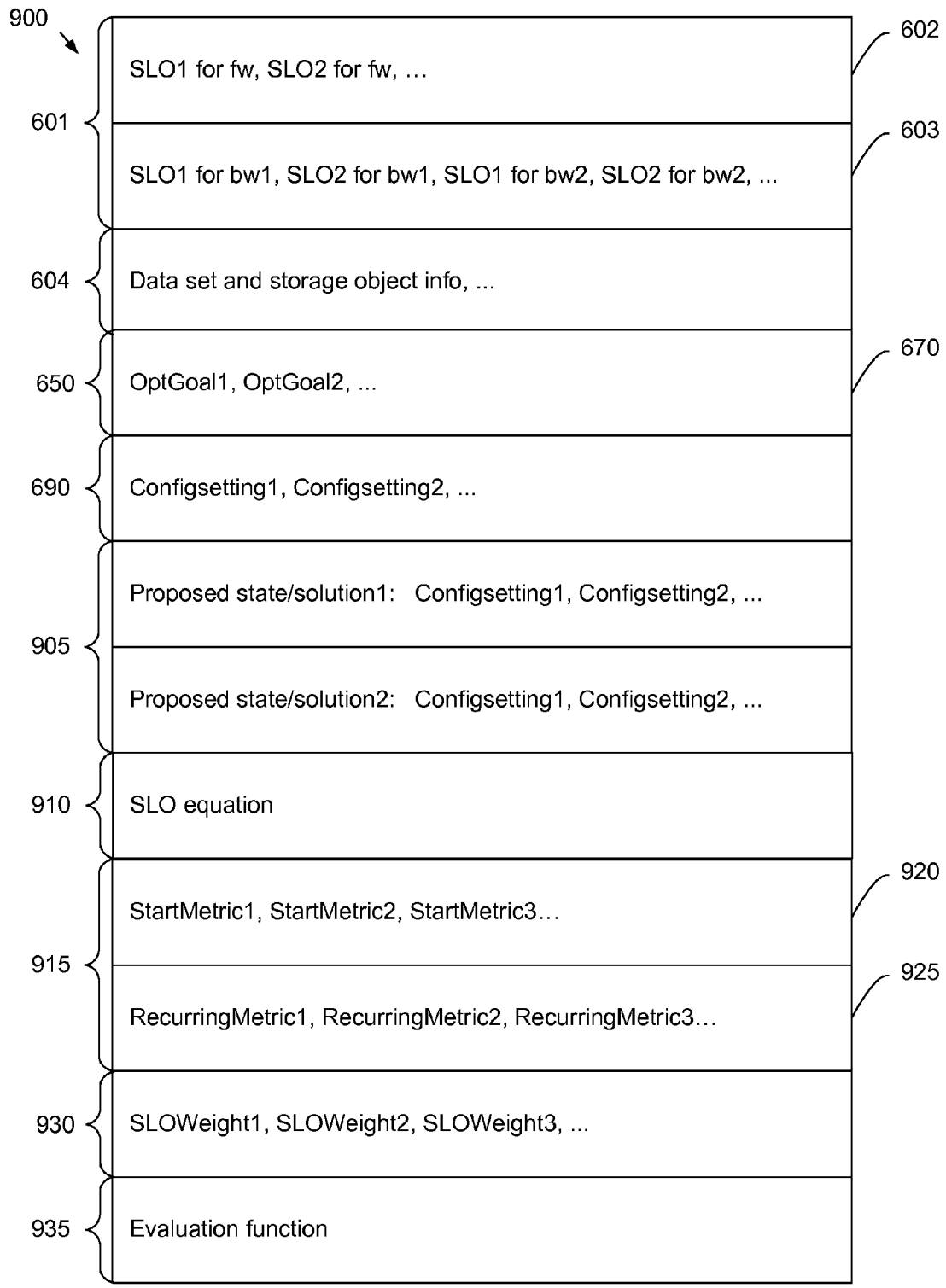
FIG. 9 shows a conceptual diagram of an exemplary evaluation data structure storing exemplary evaluation information.

The method 800 collects (at 805) evaluation information needed by the method 800 and stores the evaluation information to an evaluation data structure. FIG. 9 shows a conceptual diagram of an exemplary evaluation data structure 900 storing exemplary evaluation information. The evaluation data structure may be stored, for example, to the local storage 392 and loaded to memory 328.

As shown in FIG. 9, the evaluation information 900 may comprise some similar information as stored in the planner data structure 700 of FIG. 7. For example, in some embodiments, the evaluation information 900 may comprise SLO information 601 for the workloads of the cluster 115 (including foreground SLO information 602 and background SLO information 603), new workload information 604, new optimization goals 670, and/or current configuration settings 690 (describing the configuration settings of the current state of the cluster 115).

As discussed above, the optimization goals 670 may specify a desired objective relating to a cost that is preferred for a selected state/solution. For example, a first optimization goal may specify that proposed solutions with lower power consumption cost (lower power resource utilization) are desired over proposed solutions with higher power consumption cost. A second optimization goal may further specify that proposed solutions with lower initial start cost are desired over proposed solutions with higher initial start cost. Each optimization goal 670 may also include a weight that specifies the relative level of importance of the optimization goal. As such, each optimization goal 670 may specify an objective relating to a specific cost (e.g., lower power consumption) and a weight value (e.g., 0.5) indicating the importance of the objective. In some embodiments, optimization goals 670 may be used to dynamically modify an evaluation function used by the evaluation engine 350.

As shown in FIG. 9, the evaluation information 900 may further comprise associated configuration settings 905 for one or more proposed states/solutions, an SLO evaluation equation 910, one or more cost metrics 915, one or more SLO weights 930, and an evaluation function 935.

The configuration settings 905 may comprise configuration settings 905 associated with each proposed state/solution to be evaluated (e.g., all the remaining proposed nodes/states in the current level of the state tree). The SLO evaluation equation 910 may be used to produce an SLO evaluation value for a particular SLO of a particular workload that indicates a degree to which a proposed solution achieves the target value of the SLO metric of the SLO for the workload.

The one or more cost metrics 915 may specify cost metrics to be processed by the evaluation engine when producing the cost evaluation value for a proposed state/solution. A cost metric may represent a particular type of cost (a particular type of resource utilization) that affects the cost evaluation value produced for a proposed state/solution. The cost metrics 915 may comprise one or more start metrics 920 and/or one or more recurring metrics 925. A start metric 920 may represent a particular type of start cost comprising a one-time cost predicted to be incurred when first executing the proposed state/solution. A recurring metric 925 may represent a particular type of recurring cost comprising an ongoing recurring cost predicted to be incurred when maintaining the proposed state/solution.

Each SLO weight 930 may specify an SLO metric (e.g., data throughput) and a weight value representing the relative importance of the SLO metric. The evaluation function 935 may specify a particular mathematical process (e.g., as represented through an equation) for processing the set of SLO evaluation values and the set of cost evaluation values (e.g., by summing and taking the average for these sets of values). The evaluation function 935 may also apply a set of cost weights (specified by the optimization goals 670) to the set of cost evaluation values and a set of SLO weights (specified by the SLO weights 930) to the set of SLO evaluation values to produce a final evaluation value for the proposed state/solution.

Note that any of the evaluation information in the evaluation data structure 900 may be replaced dynamically by newly received evaluation information. For example, at least one new type of SLO, at least one new type of cost metric, at least one new type of cost or SLO weight, etc. may be received to dynamically modify the evaluation information and thus dynamically change the final evaluation values produced for the proposed states/solutions.

The method then sets (at 810) a current proposed state/solution for processing (e.g., the first remaining proposed state in the current level of the state tree in the first iteration of the method 800). For the current proposed state/solution, the method 800 then determines (at 815) an SLO evaluation value for each SLO 601 specified for each workload in the cluster. The method 800 may do so by applying an SLO equation 910 that processes the target value for the SLO metric (specified in the SLO) and a predicted value for the SLO metric that is hypothetically produced if the current proposed state/solution is executed/implemented. In some embodiments, the SLO evaluation equation 910 may be represented as:

$$s(v) = 1 - x^p$$

where:
  $s(v)$=SLO evaluation value;
  $x$=(predicted value of SLO metric/target value of SLO metric)$^{-y}$;
  $y=\{-1,1\}$ depending on the SLO metric, where $y=-1$ for a "lower is better" SLO metric and $y=1$ for a "higher is better" SLO metric; and
  $p$=priority of the workload.

At step 815, the evaluation engine 350 may initiate a modeler engine 360 that produces a predicted value of the SLO metric and returns the predicted value to the evaluation engine 350. The modeler engine 360 may produce the predicted value by using the configuration settings 905 of the current proposed state/solution. In some embodiments, the modeler engine 360 is trained using machine learning techniques (as described below in Section VI). In other embodiments, the modeler engine 360 is trained using conventional techniques. As such, for each proposed state/solution, the modeler engine 360 provides predicted values of various metrics for each workload (e.g., proposed state/solution 1 will produce N latency and M data throughput for the workload) that reflects an estimation of the effect of implementing the proposed state/solution on the workloads of the cluster.

As discussed above, an SLO of a workload comprises a target value of a SLO metric, the target value to be achieved by the cluster when servicing the workload. A SLO metric may relate to a storage system characteristic or attribute, such as a performance or protection metric. The target value may comprise a maximum or minimum value to be achieved by the cluster depending on the type of the SLO metric. For some SLO metrics (referred to as "higher is better" metrics), a higher value is desired and indicates better performance or protection. For these types of SLO metrics, the target value may comprise a minimum value to be achieved by the cluster. For example, a workload may have an SLO specifying a minimum value of X (the target value) for data throughput (the SLO metric), whereby a higher data throughput value is desired. For other SLO metrics (referred to as "lower is better" metrics), a lower value is desired and indicates better performance or protection. For these types of SLO metrics, the target value may comprise a maximum value to be achieved by the cluster. For example, a workload may have an SLO specifying a maximum value of X (the target value) for data latency (the SLO metric), whereby a lower data latency value is desired.

Optionally, a variable 'p' may be used to affect the SLO evaluation value for an SLO specified for a workload. The variable 'p' may indicate a priority number of the workload that is received, for example, from the administrator. In these embodiments, the workloads have different levels of priority/importance. For example, a workload having higher importance may have a lower p value than a workload having lower importance. In other embodiments, a workload having higher importance may have a higher p value than a workload having lower importance.

The SLO evaluation value produced for an SLO of a workload for a particular proposed state/solution indicates a degree to which the proposed state/solution is predicted to achieve the SLO for the workload. In some embodiments, a positive SLO evaluation value, whereby $e(v) \geq 0$, indicates that the SLO is at least achieved for the workload (i.e., the target value is at least met for the SLO metric). Higher positive values for the SLO evaluation value may indicate that the target value is more than achieved for the SLO metric. A negative SLO evaluation value, whereby $e(v)<0$, indicates that the SLO is not achieved for the workload (i.e., the target value is not met for the SLO metric).

In addition to determining the degree to which a proposed state/solution meets SLOs, it may also be desirable to know the cost characteristics of the proposed state/solution and how well the proposed state/solution achieves any specified optimization goals. For example, a first proposed state/solution may well meet or exceed each SLO for each workload, but consumes high amounts of power and thus incur a high power cost. A second proposed state/solution may just meet each SLO for each workload, but consumes much lower amounts of power and incur a lower power cost. It may be desirable to select the second proposed state/solution in some situations. For example, if an optimization goal specifies that a proposed state/solution with a lower power consumption cost is desired, it may be desirable to the second proposed state/solution even though the first proposed state/solution better achieves the SLOs of the workloads. As such, it is sometimes desirable to also consider the cost characteristics of a proposed state/solution.

At step 820, the method 800 determines a cost evaluation value for each cost metric 915 (specified in the evaluation data structure 900) predicted to be incurred by the current proposed state/solution. The cost metrics 915 may comprise one or more start metrics 920 and/or one or more recurring metrics 925. In these embodiments, the method determines a set of cost evaluation values for a proposed solution comprising a set of start cost evaluation values and a set of recurring cost evaluation values. A start cost evaluation value is based on a cost value of a start metric and a recurring cost evaluation value is based on a cost value of a recurring metric.

At step 820, the evaluation engine 350 may initiate a modeler engine 360 that produces a predicted value of a cost metric and returns the predicted cost value to the evaluation engine 350. The modeler engine 360 may produce the predicted cost value by using the configuration settings 905 of the current proposed state/solution. In some embodiments, the modeler engine 360 is trained using machine learning techniques or is trained using conventional techniques.

Upon receiving the predicted cost value, to produce the cost evaluation value from the predicted cost value, the method may also, at step 820, further process the predicted cost value. For example, the method 800 may standardize the received predicted cost values (e.g., standardize the values to a predetermined range of values). The method 800 may also process the received predicted cost values whereby a higher predicted cost value produces a lower cost evaluation value than a lower predicted cost value. Typically a high cost value is undesirable as it indicates that the proposed state/solution will incur a high cost in regards to the corresponding cost metric (e.g., high power consumption). As such, in these embodiments, a higher cost value produces a lower cost evaluation value. In other embodiments, a higher cost value may produce a higher cost evaluation value.

In general, however, the SLO evaluation values should be consistent with the cost evaluation values. For example, if a higher SLO evaluation value is desired over a lower SLO evaluation value, then a higher cost evaluation value should be desired over a lower cost evaluation value. In some embodiments, a higher SLO evaluation value indicates a higher degree to which the proposed state/solution is predicted to achieve the SLO for the workload relative to a lower SLO evaluation value. A higher SLO evaluation value also increases the probability of selection of the proposed state/solution relative to a lower SLO evaluation value. In these embodiments, a higher cost evaluation value indicates a lower cost incurred by the proposed state/solution relative to a lower cost evaluation value. A higher cost evaluation value also increases the probability of selection of the proposed state/solution relative to a lower cost evaluation value.

In other embodiments, however, a higher SLO evaluation value may indicate a lower degree to which the proposed state/solution achieves the SLO relative to a higher SLO evaluation value and decreases the probability of selection of the proposed state/solution relative to a lower SLO evaluation value. In these embodiments, a higher cost evaluation value indicates a higher cost incurred by the proposed state/solution relative to a lower cost evaluation value and decreases the probability of selection of the proposed state/solution relative to a lower cost evaluation value.

The method 800 then produces (at 825) a final evaluation value for the current proposed state/solution by applying an evaluation function to the sets of SLO and cost evaluation values. In some embodiments, the evaluation function may apply a set of cost weights to the set of cost evaluation values, each cost weight being applied to a particular cost evaluation value that was determined for a particular cost metric. Each cost weight may comprise a weight value for a particular cost metric for increasing or decreasing an effect of the cost evaluation value (corresponding to the particular cost metric) on the final evaluation value.

In some embodiments, the cost metrics 915 may comprise one or more start metrics 920 and/or one or more recurring metrics 925 and the set of cost evaluation values determined for a proposed solution comprises a set of start cost evaluation values and a set of recurring cost evaluation values. In some embodiments, each start metric may have a cost weight that is applied to the corresponding start cost evaluation value for increasing or decreasing its effect on the final evaluation value and each recurring metric may have a cost weight that is applied to the corresponding recurring cost evaluation value for increasing or decreasing its effect on the final evaluation value.

In other embodiments, the evaluation function may apply a set of SLO weights to the set of SLO evaluation values, each SLO weight being applied to a particular SLO evaluation value that was determined for a particular SLO metric. Each SLO weight may comprise a weight value for a particular SLO metric for increasing or decreasing an effect of the SLO evaluation value (corresponding to the particular SLO metric) on the final evaluation value. In some embodiments, the evaluation function may apply only the set of cost weights or only the set of SLO weights. In further embodiments, the evaluation function may apply both the set of cost weights and the set of SLO weights.

Each cost weight may be determined from an optimization goal 670 stored in the evaluation data structure 900, each optimization goal 670 specifying a weight value (e.g., 0.5) for an objective relating to a specific cost metric (e.g., lower power consumption). The SLO weights 930 may be stored in the evaluation data structure 900. In some embodiments, the optimization goals 670 and SLO weights 930 may be dynamically replaced with new received optimization goals 670 and/or SLO weights 930 to dynamically change the final evaluation value produced for the proposed state/solution.

In some embodiments, the evaluation function is represented by the equation: f(slo_evaluation_values[1 . . . m], SLO_weights[1 . . . m], cost_evaluation_values[1 . . . n], cost_weights[1 . . . n]).

In other embodiments, the evaluation function is represented by the equation: f(slo_evaluation_values[1 . . . m], SLO_weights[1 . . . m], start cost_evaluation_values[1 . . . n], start cost_weights[1 . . . n], recurring_cost_evaluation_values[1 . . . p], recurring_cost_weights [1 . . . p]).

In further embodiments, the evaluation function is represented by the equation: f(sw1sv1, sw2sv2, sw2sv2 . . . cw1cv1, cw2cv2, cw2cv2 . . . ); where "sw"=an SLO weight, "sv"=an SLO evaluation value, "cw"=a cost weight, and "cv"=a cost evaluation value.

The evaluation function may also comprise various forms for processing the set of SLO evaluation values, the set of cost_evaluation_values, SLO_weights, and/or cost_weights to produce the final evaluation value for the current proposed state/solution. For example, the evaluation function may comprise combinations of "mean," "average," or "sum" processes for the sets of SLO and cost_evaluation_values.

For example, the evaluation function may comprise f(average(slo_evaluation_values)+sum(start_cost_evaluation_values)+sum(recurring_cost_evaluation_values)).

For example, the evaluation function may comprise f(average(slo_evaluation_values)+average(start_cost_evaluation_values)+average(recurring_cost_evaluation_values)).

As a further example, the evaluation function may comprise f(weighted average(slo_evaluation_values)+weighted average(start_cost_evaluation_values)+weighted average (recurring_cost_evaluation_values)).

In some embodiments, the evaluation function determines a weighted average of the set of SLO evaluation values (using the SLO_weights) and a weighted average of the set of cost_evaluation_values (using the cost_weights) to determine the final evaluation value. In some embodiments, the formulation of the evaluation function may be determined experimentally for producing the best results.

The method 800 then returns (at 830) the final evaluation value determined for the current proposed state/solution to the planner engine 340. Since the single final evaluation value reflects the SLO, cost, and optimization goal characteristics of the current proposed state/solution, the evaluation value is easy to process by the planner engine 340. In some embodiments, the planner engine 340 ranks and selects the proposed states/solutions based solely on the single final evaluation value determined for each proposed state/solution.

The method 800 then determines (at 835) whether the current proposed state/solution is the last proposed state/solution to process. If not, the method 800 continues at step 810 and sets a next proposed state/solution as the current proposed state/solution for processing. If so, the method 800 then ends.

VI. MODELER-TRAINING ENGINE

A. Machine Learning Techniques

As discussed above, the modeler engine 360 may be used for predicting values of particular system metrics (e.g., SLO and/or cost metrics) that may be produced if a proposed state/solution is hypothetically implemented/executed on the cluster 115. For example, the modeler engine 360 may be used for predicting values of system metrics when the cluster 115 changes from a current state to a new proposed state, or when a new workload is to be deployed onto the cluster 115 (which itself comprises a new proposed state of the cluster 115). Accurately predicting the values of the system metrics of the proposed states/solutions prior to selection of a proposed state/solution and actual implementation (execution) of the selected proposed solution is of high importance due to the substantial amount of time and resources needed to reverse an executed proposed state/solution that does not achieve the intended results (e.g., does not achieve the SLOs of each workload of the cluster).

As used herein, a first phase comprises a "training phase" where the modeler-training engine 370 trains the modeler engine 360 by determining a mapping function for mapping a plurality of input metrics to an output metric. A second phase comprises a live "runtime phase" when the trained modeler engine 360 subsequently uses the mapping function to predict a value of the output metric on an online and operational cluster 115. The manner in which a modeler engine 360 is trained in the training phase to predict values of the output metric will determine the accuracy of the modeler engine 360 later during live runtime phase.

Typically, it is difficult to train a modeler accurately due to the high number of factors to consider within a cluster 115. For example, if a black-box model approach is taken to train the modeler, a large number of inputs need to be continuously observed for a period of time to determine their effect on a particular output (the predicted metric). Due to the increasing size and complexity of current cluster storage systems 115, it is difficult to consider all the numerous inputs that have an effect on the particular output and then to accurately determine the relationship between the numerous inputs and the output. As such, conventional modelers typically incur a high error rate in its predictions during runtime of the modeler.

In some embodiments, the modeler engine 360 comprises a modeler that was trained by a modeler-training engine 370 using machine learning techniques to produce a more accurate modeler. By using machine learning techniques, a large number of factors (inputs) may be considered to accurately predict a particular output. In these embodiments, the modeler-training engine 370 may comprise a machine learning engine that trains the modeler engine 360 for predicting values for particular metrics of the cluster storage system 115.

As known in the art, machine learning regards the use of algorithms and/or techniques that allow computer hardware and/or software to determine system behaviors and characteristics of interest based on received empirical training data. In some embodiments, the computer hardware and/or software may comprise the modeler-training engine 370. The modeler-training engine 370 may receive training data to determine a relationship between various inputs and an output of interest. The modeler-training engine 370 may be used to automatically determine this complex relationship between numerous inputs and an output using various machine learning algorithms or techniques known in the art. In some embodiments, a "supervised learning" algorithm may be used by the modeler-training engine 370 to determine a function that maps a plurality of inputs to an output of interest using received training data. In other embodiments, other machine learning algorithms or techniques known in the art may be used.

The relationship between the inputs and the output may sometimes be referred to as a "mapping function" that may be represented by a "mapping equation." The modeler-training engine 370 may analyze the training data and determine the mapping function that describes a mathematical relationship between the plurality of inputs and the output. The modeling engine may be configured to use the mapping function to then later predict a value for the desired output during runtime (e.g., when called by the evaluation engine to predict values for SLO or cost metrics).

In some embodiments, the training data processed by the modeler-training engine 370 comprises values of inputs and an output that are observed and recorded for an online and operational cluster storage system. In some embodiments, an output processed by the modeler-training engine 370 may comprise a value for a particular system metric of interest (referred to as an output metric) of a particular workload of interest (referred to as the foreground workload) of a cluster 115. As such, an output comprises 1) a value of 2) an output metric of 3) a foreground workload. The other workloads of the cluster may be referred to as background workloads.

In some embodiments, an input processed by the modeler-training engine 370 may comprise a value of a particular system metric (referred to as an input metric) of a foreground or background workload of the cluster 115. In these embodiments, the plurality of inputs may comprise a value for a plurality of output metrics for each foreground and background workload of a cluster. As such, an input comprises 1) a value of 2) an input metric of 3) a foreground or background workload. The input and output values of the foreground and background workloads of the cluster may comprise the training data for the modeler-training engine 370.

In some embodiments, the training data received by the modeler-training engine 370 may comprise input and output values that are collected at a plurality of time points over a predetermined period of time. The training data may be formatted into a plurality of data sets, each data set comprising a single value for the output metric of the foreground workload and a value for each input metric of each foreground and background workload, each value in a data set being observed and recorded at a same point in time.

For example, if 4 input metrics of 11 background workloads and a foreground workload are being considered, each data set may comprise a total of 49 values: a single value for the output metric of the foreground workload and a value for each of 4 input metrics of 12 workloads (comprising 11 background workloads and 1 foreground workload). Each of the 49 values in a data set may have been observed and recorded from an operational cluster 115 at a same point in time. A first data set may comprise input and output values collected at a first time point, a second data set may comprise input and output values collected at a second time point, etc. A large number of data sets may be observed and recorded from the cluster 115 over a predetermined period of time (e.g., three days) at predetermined time intervals (e.g., every 5 minutes).

Typically, a larger number of input metrics from a larger number of workloads is considered to produce the mapping function which may produce an enormous amount of training data over a period of time. Given the enormous amount of training data produced from a cluster 115, use of machine learning techniques may be advantageous. However, typically machine learning techniques have not been used to train modelers for storage systems. This is due to an input constraint that is required for most machine learning techniques.

As known in the art, machine learning techniques typically require that the number of values for inputs in a data set that is used in the training phase be the same number of inputs in a data set when the modeler is later used during the runtime phase to predict a value for an output. In the above example, each data set in the training phase comprises a total of 49 values: a single value for the output metric of the foreground workload and a value for each of 4 input metrics of 12 workloads (comprising 11 background workloads and 1 foreground workload). As such, in each data set there is 1 value for an output metric and 48 values for input metrics (i.e., 48 values for inputs). As such, a length of the input vector is 48 inputs. As such, if a modeler was trained using 48 values for inputs in each data set, each data set used during the runtime phase should also have 48 values for inputs to accurately predict the value for the output.

However, during the runtime phase, the actual number of workloads serviced by a cluster 115 may vary and be less or more than the number of workloads used to train the modeler during the training phase. For example, during the runtime phase, there may be only 10 workloads (comprising 9 background workloads and 1 foreground workload). As such, the data set used during runtime would only comprise 40 values for input metrics (a value for each of 4 input metrics of 10 workloads). Thus, a length of the input vector is now different at 40 inputs. In this situation, the runtime data set would not produce an accurate predicted value for the output metric. This is also true if there are, for example, 14 workloads during the runtime phase. Since the number of workloads serviced by a cluster 115 may continually vary, machine learning techniques have not conventionally been used to train the modeler.

B. Overview of Modeler-Training Engine

In some embodiments, the modeler-training engine 370 uses adapted machine learning techniques, to produce a mapping function used by the modeler engine 360, that addresses the input constraint of machine learning. In these embodiments, input values from a different number of workloads may be used during the runtime phase than during the training phase. As such, the workloads serviced by a cluster 115 may continually vary without affecting the accuracy of the mapping function and the values predicted for the output.

In some embodiments, the modeler-training engine 370 further processes each received data set in the training data to produce a modified data set (referred to as a "tuple set") that summarizes input values for two or more background workloads. In these embodiments, each received data set comprises values for input metrics of the foreground and background workloads, and a value for an output metric of the foreground workload. For each data set, the modeler-training engine 370 may summarize the values received for each input metric of a first set of two or more background workloads to produce a representative value for each input metric of the first set of background workloads. For example, the representative value may comprise the average, mean, minimum, or maximum of the received values, depending on the input metric.

For each data set, the modeler-training engine 370 may then produce a tuple set representing the data set, the tuple set comprising values for the plurality of input metrics of the foreground workload, the representative values for the plurality of input metrics of the first set of background workloads, and a value for the output metric of the foreground workload. Note that the number of representative values for the first set of background workloads is equal to the number of input metrics that are considered by the modeler-training engine 370, whereby a representative value represents all background workloads in the first set in regards to a particular input metric. The modeler-training engine 370 may then process the plurality of tuple sets using machine learning techniques to determine/produce a mapping function that maps the plurality of input metrics of the foreground workload and the first set of background workloads to the output metric of the foreground workload.

For example, each received data set may comprise a value for each of 4 input metrics of 13 workloads (comprising 12 background workloads and 1 foreground workload) and a single value for the output metric of the foreground workload. In this example, the first set of background workloads may comprise all 12 background workloads. For each data set, the modeler-training engine 370 may summarize the values received for each of 4 input metrics of the first set of background workloads to produce 4 representative values for the 4 input metrics of the first set of background workloads.

For each data set, the modeler-training engine 370 may then produce a tuple set comprising values for the 4 input metrics of the foreground workload, the 4 representative values for the 4 input metrics of the first set of background workloads, and 1 value for the output metric of the foreground workload. The modeler-training engine 370 may then process the plurality of tuple sets using machine learning techniques to determine/produce the mapping function.

During the runtime phase, a similar process may be performed by the modeler engine 360, whereby the modeler engine 360 may receive a single data set and further processes the received data set to produce a tuple set that summarizes input values for two or more background workloads. In these embodiments, the received data set comprises values for the input metrics of the foreground and background workloads, whereby the modeler engine 360 is to predict a value for the output metric of the foreground workload by using the mapping function and the received data set.

For the received data set, the modeler engine 360 may summarize the values received for each input metric of a second set of two or more background workloads to produce a representative value for each input metric of the second set of background workloads. The modeler engine 360 may then produce a tuple set representing the data set, the tuple set comprising values for the plurality of input metrics of the foreground workload and the representative values for the plurality of input metrics of the second set of background workloads. The modeler engine 360 may then predict a value for the output metric of the foreground workload by using the mapping function and the tuple set.

For example, during the runtime phase, the cluster 115 may be currently servicing 11 workloads comprising 10 background workloads and 1 foreground workload. Typically this would violate the input constraint of machine learning since the number of background workloads is different which would change the number of values for the input metrics. The received data set may comprise a value for each of 4 input metrics of the 11 workloads. In this example, the second set of background workloads may comprise all 10 background workloads. The modeler engine 360 may then summarize the values received for each of 4 input metrics of the second set of background workloads to produce 4 representative values for the 4 input metrics of the second set of background workloads.

The modeler engine 360 may then produce a tuple set comprising 4 values for the 4 input metrics of the foreground workload and the 4 representative values for the 4 input metrics of the second set of background workloads. As such, the number of values used for the input metrics is still the same in the training and runtime phases. In this example, there are 8 total values used for the input metrics in the training and runtime phases (4 values from the foreground workload and the 4 values from the background workloads). The modeler engine 360 may then predict a value for the output metric of the foreground workload by using the mapping function and the tuple set. Since the number of values used for the input metrics is still the same in the runtime phase, the mapping function should produce an accurate prediction of the value for the output metric.

In the above examples, for illustrative purposes, the first and second set of background workloads comprised all background workloads serviced by the cluster. In the training phase example, there were 12 background workloads being serviced by the cluster and the first set of background workloads having its input metrics summarized comprised all 12 background workloads. In the runtime phase example, there were 10 background workloads being serviced by the cluster and the second set of background workloads having its input metrics summarized comprised all 10 background workloads. In these embodiments, the values of a particular input metric for all background workloads being serviced by the same cluster storage system 115 may be summarized to produce a single representative value.

In other embodiments, however, other criterion may be used to select the background workloads whose input values may be summarized. In some embodiments, summarizing input values from background workloads showing particular characteristics have been determined to provide a more accurate mapping function. While the workloads serviced by a cluster all use components of the cluster, the workloads do not all share use of the same components.

In some embodiments, the values of a particular input metric for background workloads that share use of at least one common hardware component of the cluster storage system may be summarized to produce a single representative value. When servicing two or more workloads, the cluster storage system may use a common hardware component to provide data service to each of the two or more workloads. In this regard, the two or more workloads may be viewed as sharing use of the common hardware component. In other embodiments, the values of a particular input metric for background workloads that share use of at least one common hardware component of the cluster storage system with the foreground workload may be summarized to produce a single representative value.

In further embodiments, for each data set, the background workloads may be divided into two or more sets of background workloads, such as a first set and a second set. Within each set, the values for the input metrics of the background workloads may be summarized. For example, the first set of background workloads may each share use of a first common hardware component and the second set of background workloads may each share use of a second common hardware component of the cluster storage system. In these embodiments, the values for the input metrics of the first set of background workloads may be summarized together to produce a first set of representative values and the values for the input metrics of the second set of background workloads may be summarized together to produce a second set of representative values. In other embodiments, the first set of background workloads may each share use of a first common hardware component with the foreground workload and the second set of background workloads may each share use of a second common hardware component with the foreground workload.

In additional embodiments, for each data set, the values for the input metrics of one or more background workloads may be ignored, the one or more background workloads not sharing use of any common hardware component with other background workloads serviced by the cluster. For example, the background workloads may be divided into two or more sets of background workloads, such as a first set and a second set. For example, the first set of background workloads may each share use of a common hardware component and the second set of background workloads may not share use of any common hardware component with any other background workloads. In these embodiments, the values for the input metrics of the first set of background workloads may be summarized together to produce a set of representative values and the values for the input metrics of the second set of background workloads may be ignored/discarded so as to not affect the determination of the mapping function.

If the background workloads are grouped into sets according to use of common hardware components during the training phase, the background workloads should likewise be grouped into the same sets according to use of common hardware components during the runtime phase. For example, if in the training phase, the background workloads sharing a first common hardware component (e.g., a CPU) are grouped into a first set, and background workloads sharing a second common hardware component (e.g., a storage device) are grouped into a second set, then during the runtime phase, the background workloads should be similarly grouped and summarized.

C. Training Phase Method

Figure 10:
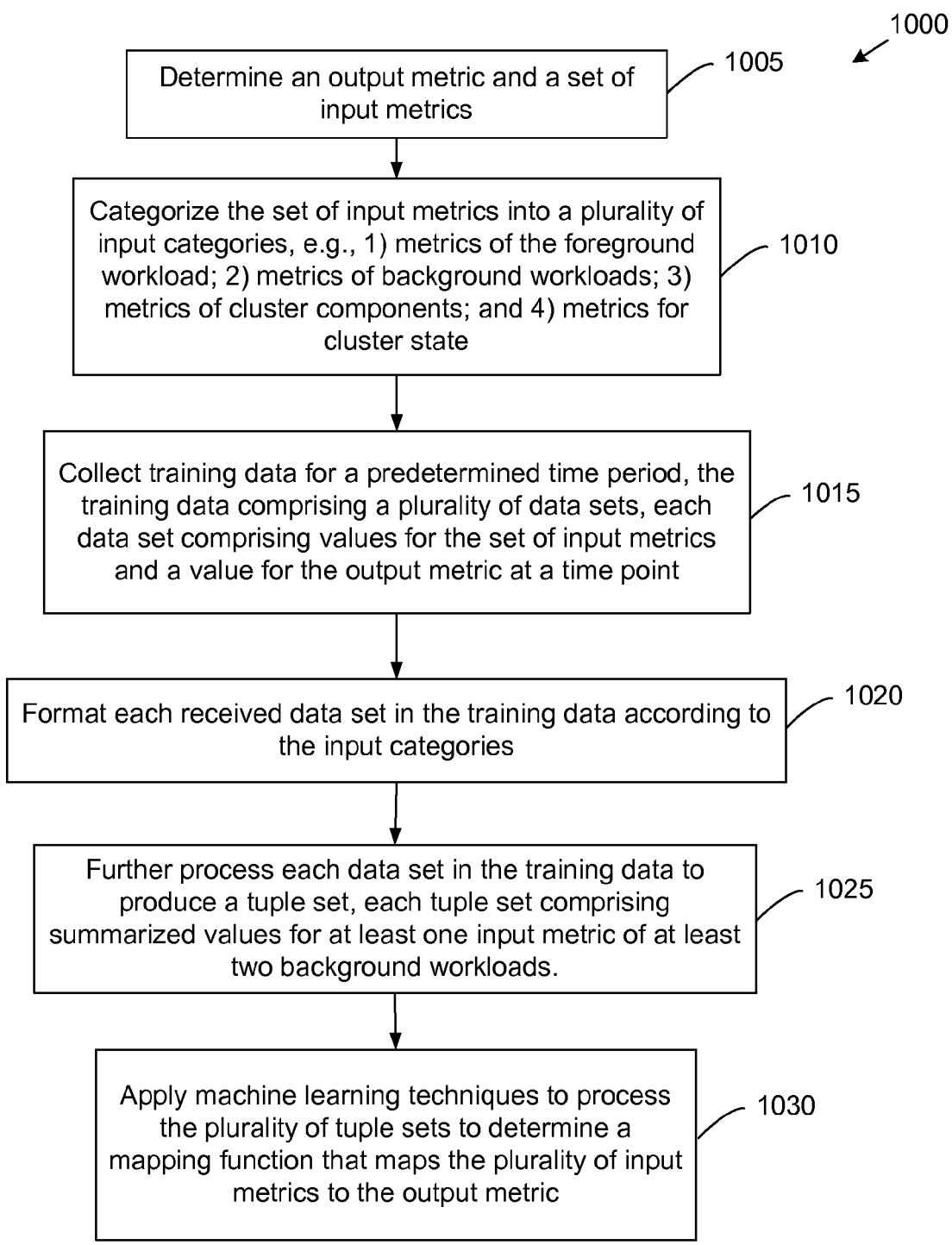
FIG. 10 is a flowchart of an training method for training a modeler using machine learning.

FIG. 10 is a flowchart of an training method 1000 for training a modeler using machine learning. In some embodiments, the method 1000 is implemented by hardware and/or software configured to perform the method 1000. In some embodiments, the steps of method 1000 are performed by various hardware and/or software components residing or executing on the server system 110, the cluster storage system 115, and/or the management server 140. In some embodiments, the steps of method 1000 are performed by the modeler-training engine 370 to train the modeler engine 360. The order and number of steps of the method 1000 are for illustrative purposes only and, in other embodiments, a different order and/or number of steps are used.

The method 1000 begins by determining (at 1005) an output metric of interest of a foreground workload (for which the mapping function is determined) and a set of input metrics. As used in this section, a mapping function is determined for an output metric produced by a "foreground workload" of a cluster 115. As used in this section, all other workloads of the cluster may be referred to as "background workloads." The output metric may comprise any measureable characteristic or attribute of the foreground workload that is of interest. For example, the output metric may comprise the data latency, data throughput, or power consumption of the foreground workload. A mapping function is to be determined for the specific output metric (e.g., a mapping function may be determined for data latency).

The set of input metrics may comprise any metric of the cluster that may affect the value of the output metric of the foreground workload. The set of input metrics may comprise metrics of the foreground and background workloads as well as other metrics not relating to the workloads (as discussed below). These may include input metrics that are believed or known in the art to have an effect on the particular output metric. For illustrative purposes, the method 1000 determines a mapping function that maps a plurality of input metrics to a single output metric. The method 1000 may be repeated, however, to determine a plurality of mapping functions for a plurality of different output metrics.

The method 1000 then categorizes (at 1010) the set of input metrics into a plurality of input categories to provide a canonical format for the input metrics. In some embodiments, the set of input metrics are divided into four categories: 1) zero or more metrics of the foreground workload; 2) zero or more metrics of background workloads; 3) zero or more metrics of hardware and/or software components of the cluster storage system; and 4) zero or more metrics for a current state of the cluster storage system.

Examples of metrics of hardware and/or software components of the cluster include number, types, or specifications of storage devices, storage device controllers, CPUs, memory devices, etc. Here, a "type" of a component may refer to the type of underlying technology of the component (e.g., a type of storage device may include a SATA or FibreChannel type). Here, a "specification" of a component may refer to performance or capacity attributes of the component (e.g., a storage device's RPM or data capacity). In other embodiments, metrics of hardware and/or software components of the cluster include other metrics. Examples of metrics for a current state of the cluster include configuration settings associated with the current state of the cluster. Metrics for a current state of the cluster may also include other information describing the state of the cluster, such as storage device fragmentation levels, resource utilization levels (e.g., CPU, storage device, network utilization levels), resource failure characteristics (e.g., indicating whether a CPU, node, network, or storage device is not operational/down), whether the cluster system is in degraded mode, number of primary and secondary workloads (e.g., disk scrubbing, de-duplication, copy operations), IOPs in transition, state of data on a storage device (e.g., whether it is de-duplicated, compressed, etc), length of time the cluster has been online and operational, etc.

The method 1000 then collects (at 1015) training data from the cluster for a predetermined time period, the training data comprising a plurality of data sets. Each data set may comprise values for the set of input metrics and a value for the output metric that was observed on the cluster and recorded at a particular time point.

The method 1000 then formats (at 1020) each received data set (in the training data) according to the input categories determined in step 1010. FIG. 11 shows a conceptual diagram of training data 1100 that has been formatted according to a plurality of input categories. The training data 1100 comprises a plurality of data sets 1105, each data set 1105 comprising values received for a set of input metrics and an output metric at a particular time point. In the example of FIG. 11, the received input values for may be categorized into four categories: 1) values for input metrics of the foreground workload 1110; 2) values for input metrics of background workloads 1115; 3) values for input metrics of cluster components 1120; and 4) values for input metrics for the cluster state 1125. Each data set 1105 also includes a category for a value for the output metric of the foreground workload 1130.

In the example of FIG. 11, there are three input metrics for the foreground and background workloads that are collected. A first value ("v1") is received for a first input metric of a foreground or background workload, a second value ("v2") is received for a second input metric of a foreground or background workload, and a third value ("v3") is received for a third input metric of a foreground or background workload. In the example of FIG. 11, there are two input metrics each for the cluster components 1120 and the cluster state 1125. In the example of FIG. 11, for illustrative purposes, each input category comprises only a few metrics, while typically each category may have a much larger number of metrics.

The method 1000 then further processes (at 1025) each data set (in the plurality of data sets) to produce a tuple set by summarizing values for at least one input metric of at least two background workloads. In some embodiments, for each data set, the method 1000 may summarize the values received for each input metric of a first set of two or more background workloads to produce a representative value for each input metric of the first set of background workloads.

Figure 12A:
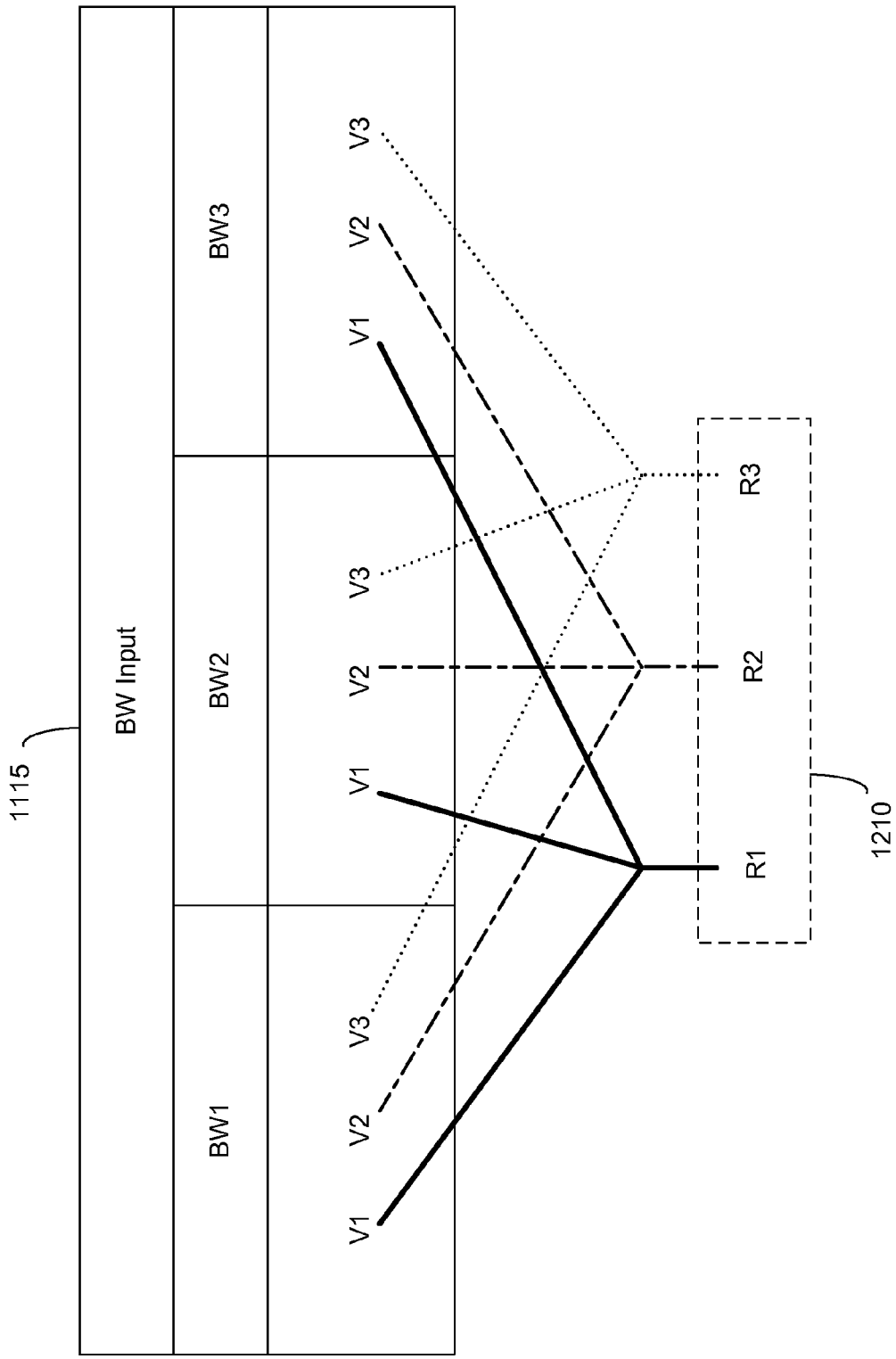
FIG. 12A shows a conceptual diagram of exemplary values for input metrics of a first set of background workloads that are summarized.

FIG. 12A shows a conceptual diagram of exemplary values for input metrics of a first set of background workloads 1115 that are summarized. In the example of FIG. 12A, there are values for three input metrics (V1, V2, V3) of each of three background workloads (BW1, BW2, BW3) serviced by the cluster. In other embodiments, there are a different number of input metrics that are considered and the cluster services a different number of background workloads. In this example, the three background workloads (BW1, BW2, BW3) comprise the first set of background workloads.

The values received for a first input metric of the first set of background workloads (i.e., values V1 from BW1, V1 from BW2, and V1 from BW3) are summarized to produce a representative value R1 for the first input metric of the first set of background workloads. For example, "summarizing" the received values (V1 from BW1, V1 from BW2, and V1 from BW3) may comprise determining an average, mean, minimum, or maximum of the received values (depending on the type of input metric) to produce the representative value R1. Similarly, the values received for a second input metric of the first set of background workloads (i.e., values V2 from BW1, V2 from BW2, and V2 from BW3) are summarized to produce a representative value R2 for the second input metric and the values received for a third input metric of the first set of background workloads (i.e., values V3 from BW1, V3 from BW2, and V3 from BW3) are summarized to produce a representative value R3 for the third input metric.

This produces a set of representative values 1210 (R1, R2, R3) for the first set of background workloads. Note that the number of representative values for the first set of background workloads is equal to the number of input metrics that are considered by the method 1000, whereby a representative value represents all background workloads in the first set in regards to a particular input metric. In the example of FIG. 12A, there are three representative values produced for the first set of background workloads for representing three types of input metrics. As such, during the runtime phase, a similar process is used so that the number of background workloads in the first set may vary while still providing the same number of representative values for the first set.

At step 1025, the method 1000 then uses representative values to produce a tuple set for representing each data set 1105 in the training data 1100. FIG. 12B shows a conceptual diagram of training data 1100 that has been processed to comprise a plurality of tuple sets 1215. As shown in FIG. 12B, each tuple set 1215 comprises similar data as the corresponding data set 1105, except the values for input metrics of background workloads 1115 are replaced by the set of representative values 1210. As such, each tuple set 1215 comprises values for the plurality of input metrics of the foreground workload 1110, the representative values for the plurality of input metrics of the first set of background workloads 1210, values for input metrics of cluster components 1120, values for input metrics for the cluster state 1125, and a value for the output metric of the foreground workload 1130.

In the example of FIG. 12A-B, for illustrative purposes, the first set of background workloads comprised all background workloads serviced by the cluster. In these embodiments, the values of a particular input metric for all background workloads being serviced by the same cluster storage system 115 may be summarized to produce a single representative value for the particular input metric.

In other embodiments, however, other criterion may be used to select the background workloads whose input values may be summarized. In some embodiments, the values of a particular input metric for only those background workloads that directly share use of at least one common hardware component of the cluster storage system may be summarized to produce a single representative value. In other embodiments, the values of a particular input metric for background workloads that share use of at least one common hardware component of the cluster storage system with the foreground workload may be summarized to produce a single representative value.

For example, in some embodiments, the at least one common hardware component comprises an aggregate, storage device, processor, or memory device, or any combination thereof. In other embodiments, the at least one common hardware component comprises another type of hardware component of the cluster. In some embodiments, the at least one common hardware component comprises a specific combination of hardware components, such as common processor and memory device, etc.

Figure 13A:
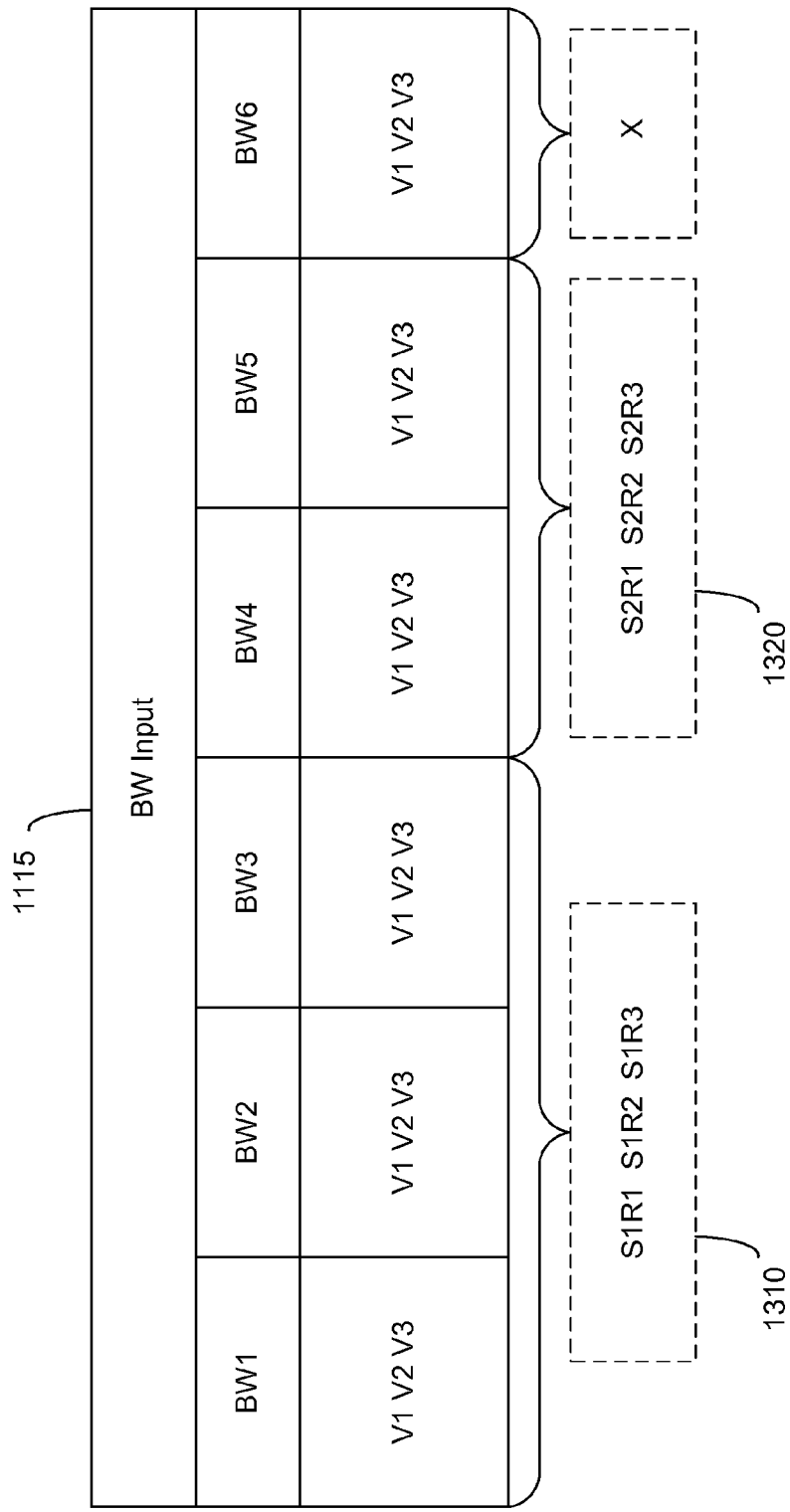
FIG. 13A shows a conceptual diagram of exemplary values for input metrics of background workloads that are divided into multiple sets of background workloads for summarization.

In further embodiments, for each data set, the background workloads may be divided into two or more sets of background workloads based on use of common hardware components of the cluster. FIG. 13A shows a conceptual diagram of exemplary values for input metrics of background workloads that are divided into multiple sets of background workloads based on use of common hardware components. In the example of FIG. 13A, a first set of background workloads comprises BW1, BW2, and BW3 that share a first common hardware component and a second set of background workloads comprises BW4 and BW5 that share a second common hardware component of the cluster storage system.

For example, the first set of background workloads may each share use of a common storage device and the second set of background workloads may each share use of a common memory device. For example, the first set of background workloads may each share use of a common storage device and the second set of background workloads may each share use of a common processor and memory device. In other embodiments, the first set of background workloads may each share use of a first common hardware component with the foreground workload and the second set of background workloads may each share use of a second common hardware component with the foreground workload.

Within each set of background workloads that share a common component, the values for each input metric of the background workloads in the set may be summarized to produce a representative value for each input metric. In the example of FIG. 13A, the values for each input metric of the first set of background workloads may be summarized together to produce a first set of representative values 1310 (S1R1, S1R2, and S1R3) that represent each input metric (first, second, and third input metrics, respectively) for the first set of background workloads. Likewise, the values for each input metric of the second set of background workloads may be summarized together to produce a second set of representative values 1320 (S2R1, S2R2, and S2R3) that represent each input metric (first, second, and third input metrics, respectively) for the second set of background workloads.

Note that the total number of representative values for the first and second sets of background workloads is now equal to the number of sets multiplied by the number of input metrics that are considered by the method 1000, whereby two representative values represent the background workloads in the two sets in regards to a particular input metric (e.g., S1R1 and S2R1 represent the first input metric for the two set of background workloads). As such, during the runtime phase, a similar process may be used so that the number of background workloads in the first and second sets may vary while still providing the same total number of representative values for the first and second sets.

In additional embodiments, in processing each data set to produce a tuple set, the values for the input metrics of one or more background workloads may be ignored, the one or more background workloads not sharing use of any common hardware component with other background workloads serviced by the cluster 115. In the example of FIG. 13A, a third set of background workloads comprises BW6 that does not share a common hardware component with any of the background workloads of the cluster storage system. For example, the third set of background workloads may comprise background workloads that does not share a common hardware component (e.g., storage device or aggregate) with the first set of background workloads and also does not share a common hardware component (e.g., processor and memory device) with the second set of background workloads. As such, the values for the input metrics of background workload BW6 may be ignored/discarded (as indicated by "X") so as to not affect the determination of the mapping function.

If the background workloads are grouped into sets according to use of common hardware components during the training phase, the background workloads should likewise be grouped into the same sets according to use of common hardware components during the runtime phase. For example, if in the training phase, the background workloads sharing a first common hardware component (e.g., a CPU) are grouped into a first set, and background workloads sharing a second common hardware component (e.g., a storage device) are grouped into a second set, then during the runtime phase, the background workloads should be similarly grouped and summarized.

At step 1025, the method 1000 then uses representative values to produce a tuple set for representing each data set 1105 in the training data 1100. FIG. 13B shows a conceptual diagram of training data 1100 that has been processed to comprise a plurality of tuple sets 1215. As shown in FIG. 13B, each tuple set 1215 comprises similar data as the corresponding data set 1105, except the values for input metrics of background workloads 1115 are replaced by first and second sets of representative values 1210.

The method 1000 may then apply (at 1030) machine learning techniques to process the plurality of tuple sets 1215 of the training data 1100 to determine a mapping function. The mapping function maps the plurality of input metrics to the output metric of the foreground workload in the tuple sets 1215 by using the values and representative values of the plurality of input metrics (1110, 1210, 1120, and 1125) and the values of the output metric of the foreground workload 1130. The mapping function specifies a mathematical relationship between the input metrics and the output metric and may be represented by a "mapping equation."

The method 1000 then ends. For illustrative purposes, the method 1000 determines a mapping function that maps a plurality of input metrics to a single output metric. The method 1000 may be repeated, however, to determine a mapping function for a plurality of different output metrics.

D. Runtime Phase Method

Figure 14:
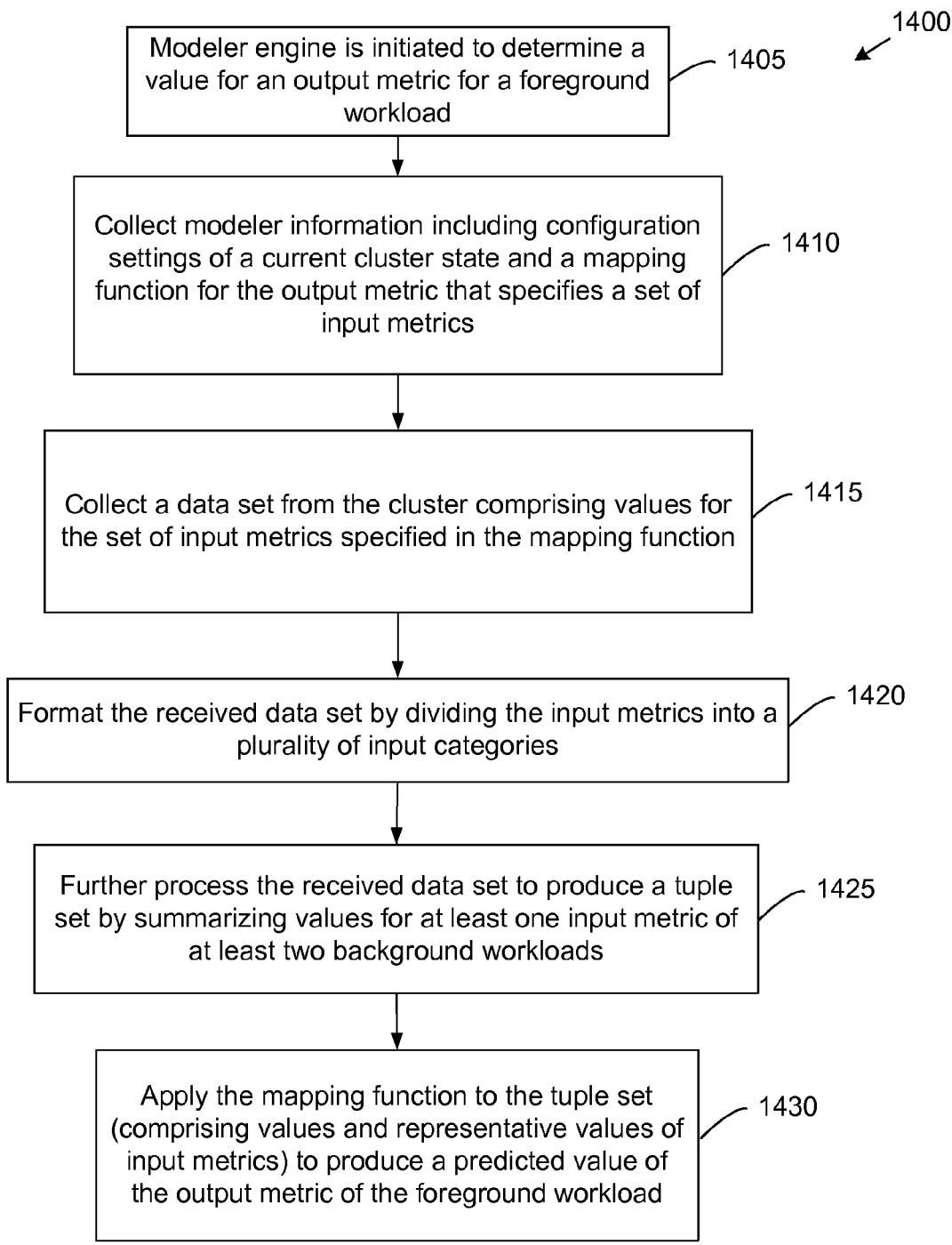
FIG. 14 is a flowchart of a modeler method for using a mapping function to predict a value for an output metric.

After determining the mapping function (at step 1030 of method 1000), the modeling engine 360 may later be configured to use the mapping function to predict a value for the output metric during a runtime phase. FIG. 14 is a flowchart of a modeler method 1400 for using a mapping function to predict a value for an output metric of a foreground workload. In some embodiments, the method 1400 is implemented by hardware and/or software configured to perform the method 1400. In some embodiments, the steps of method 1400 are performed by various hardware and/or software components residing or executing on the server system 110, the cluster storage system 115, and/or the management server 140. In some embodiments, the steps of method 1400 are performed by the modeler engine 360. The order and number of steps of the method 1400 are for illustrative purposes only and, in other embodiments, a different order and/or number of steps are used.

The method 1400 begins when the modeler engine 360 is initiated (at 1405) to determine a value for an output metric for a foreground workload of a cluster. For example, the modeler engine 360 may be triggered by the evaluation engine 350 at step 815 or 820 in method 800. For example, the foreground workload may comprise a workload having an SLO violation or is being deployed onto the cluster.

The method 1400 then collects (at 1410) modeler information needed to predict the output metric. The modeler information may comprise, for example, configuration settings of a current state of the cluster and the mapping function previously determined (e.g., as determined by the method 1000)

for the desired output metric. The mapping function may specify a set of input metrics that are needed to predict the output metric.

The method 1400 then collects (at 1415) a data set from the cluster comprising values for the set of input metrics specified in the mapping function. The method 1400 then formats (at 1420) the received data set by dividing the input metrics into a plurality of input categories. In some embodiments, the set of received input metrics are divided into four categories: 1) zero or more metrics of the foreground workload; 2) zero or more metrics of background workloads; 3) zero or more metrics of cluster components; and 4) zero or more metrics for a current cluster state.

The method 1400 then further processes (at 1425) the received data set to produce a tuple set by summarizing values for at least one input metric of at least two background workloads. The method 1400 may produce the tuple set in a similar manner as done previously at step 1025 of the training method 1000. Step 1425 of the modeler method 1400 may comprise similar processes and produce a similar tuple set 1215 (as shown in FIGS. 12B and 13B) as step 1025 of the training method 1000, however, with no value for the output metric of the foreground workload 1130.

Since the tuple set comprises summarized values for input metrics of background workloads, the number of values used for the input metrics may be kept the same in the training method 1000 and the runtime method 1400, even though the number of background workloads during the runtime method 1400 may be greater or less than the number of background workloads during the training method 1000. As such, the input constraint of machine learning is not violated and the mapping function may still produce an accurate prediction.

The method 1400 then applies (at 1430) the mapping function to the tuple set (comprising values and representative values of input metrics) to produce a predicted value of an output metric of the foreground workload. The method 1400 then ends. For illustrative purposes, the method 1400 determines a single output metric of the foreground workload using a single mapping function. The method 1400 may be repeated, however, to determine values for a plurality of different output metrics using a plurality of corresponding mapping functions.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. At least one non-transitory machine-readable medium comprising a set of instructions that, in response to being executed on a computing device, cause the computing device to:
   identify, in response to a triggering event associated with a workload of a storage system, a proposed solution comprising one or more actions to be performed;
   predict, for the proposed solution, a value of an output metric for the workload using a mapping function for the output metric based on a plurality of input metric values for a foreground workload and a plurality of input metric values for a set of background workloads of the storage system, the mapping function produced using a machine learning algorithm; and
   generate an evaluation value for the proposed solution based on the predicted value of the output metric.

2. The at least one non-transitory machine-readable medium of claim 1, comprising a set of instructions that, in response to being executed on the computing device, cause the computing device to:
   predict, for the proposed solution, respective values of each of a plurality of output metrics for the workload using respective mapping functions for each of the plurality of output metrics; and
   generate the evaluation value for the proposed solution based on the respective predicted values of each of the plurality of output metrics.

3. The at least one non-transitory machine-readable medium of claim 1, comprising a set of instructions that, in response to being executed on the computing device, cause the computing device to implement the proposed solution by performing the one or more actions.

4. The at least one non-transitory machine-readable medium of claim 1, comprising a set of instructions that, in response to being executed on the computing device, cause the computing device to:
   identify a plurality of proposed solutions in response to the triggering event;
   generate a respective evaluation value for each of the plurality of proposed solutions; and
   implement, from among the plurality of proposed solutions, a proposed solution corresponding to a highest respective evaluation value.

5. The at least one non-transitory machine-readable medium of claim 1, the triggering event comprising a violation of a service level objective (SLO) for the workload.

6. The at least one non-transitory machine-readable medium of claim 1, the one or more actions comprising one or more of a storage object migration, a storage object compression, and a storage object deduplication.

7. A system, comprising:
   a logic circuitry;
   a modeler-training engine for execution by the logic circuitry to produce a mapping function for an output metric by implementing a machine learning algorithm;
   a planner engine for execution by the logic circuitry to identify, in response to a triggering event associated with a foreground workload of a storage system, a proposed solution comprising one or more actions to be performed;
   a modeler engine for execution by the logic circuitry to predict, for the proposed solution, a value of the output metric for the foreground workload using the mapping function based on a plurality of input metric values for the foreground workload and a plurality of input metric values for a set of background workloads of the storage system; and
   an evaluation engine for execution by the logic circuitry to generate an evaluation value for the proposed solution based on the predicted value of the output metric.

8. The system of claim 7, the modeler-training engine for execution by the logic circuitry to produce respective mapping functions for each of a plurality of output metrics, the modeler engine for execution by the logic circuitry to predict, for the proposed solution, respective values of each of the plurality of output metrics for the foreground workload using the respective mapping functions for each of the plurality of output metrics, the evaluation engine for execution by the logic circuitry to generate the evaluation value for the proposed solution based on the respective predicted values of each of the plurality of output metrics.

9. The system of claim 7, the planner engine for execution by the logic circuitry to identify a plurality of proposed solutions in response to the triggering event, the evaluation engine for execution by the logic circuitry to generate a respective evaluation value for each of the plurality of proposed solutions, the system to implement, from among the plurality of proposed solutions, a proposed solution corresponding to a highest respective evaluation value.

10. The system of claim 7, the triggering event comprising a violation of a service level objective (SLO) for the foreground workload.

11. The system of claim 7, the storage system comprising a cluster storage system.

12. The system of claim 7, comprising a display.

13. A method, comprising:
   identifying, in response to a triggering event associated with a workload of a storage system, a proposed solution comprising one or more actions to be performed;
   predicting, for the proposed solution, a value of an output metric for the workload using a mapping function for the output metric based on a plurality of input metric values for a foreground workload and a plurality of input metric values for a set of background workloads of the storage system, the mapping function produced using a machine learning algorithm; and generating, by a processor circuit, an evaluation value for the proposed solution based on the predicted value of the output metric.

14. The method of claim 13, comprising:

predicting, for the proposed solution, respective values of each of a plurality of output metrics for the workload using respective mapping functions for each of the plurality of output metrics; and generating the evaluation value for the proposed solution based on the respective predicted values of each of the plurality of output metrics.

15. The method of claim 13, comprising implementing the proposed solution by performing the one or more actions.

16. The method of claim 13, comprising:

identifying a plurality of proposed solutions in response to the triggering event;

generating a respective evaluation value for each of the plurality of proposed solutions; and implementing, from among the plurality of proposed solutions, a proposed solution corresponding to a highest respective evaluation value.

17. The method of claim 13, the triggering event comprising a violation of a service level objective (SLO) for the workload.

* * * * *